United States Patent
Webster et al.

(10) Patent No.: US 12,023,816 B2
(45) Date of Patent: Jul. 2, 2024

(54) AMPHIPHILIC SURFACE-MODIFYING ADDITIVES TO IMPROVE FOULING-RELEASE OF MARINE COATINGS

(71) Applicant: NDSU RESEARCH FOUNDATION, Fargo, ND (US)

(72) Inventors: Dean C. Webster, Fargo, ND (US); Alireza Rahimi, N. Royalton, OH (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 485 days.

(21) Appl. No.: 17/200,442

(22) Filed: Mar. 12, 2021

(65) Prior Publication Data

US 2021/0292573 A1    Sep. 23, 2021

Related U.S. Application Data

(60) Provisional application No. 62/988,638, filed on Mar. 12, 2020.

(51) Int. Cl.
| | |
|---|---|
| *B25J 9/16* | (2006.01) |
| *B25J 15/00* | (2006.01) |
| *B25J 15/06* | (2006.01) |
| *C09D 5/16* | (2006.01) |
| *C09D 183/10* | (2006.01) |
| *G06F 18/21* | (2023.01) |
| *G06F 18/214* | (2023.01) |
| *G06T 7/00* | (2017.01) |
| *G06T 7/62* | (2017.01) |
| *G06T 7/70* | (2017.01) |

(52) U.S. Cl.
CPC ........... *B25J 9/1687* (2013.01); *B25J 9/1612* (2013.01); *B25J 9/163* (2013.01); *B25J 15/0014* (2013.01); *B25J 15/0616* (2013.01); *B25J 15/0683* (2013.01); *C09D 5/1675* (2013.01); *C09D 5/1687* (2013.01); *C09D 183/10* (2013.01); *G06F 18/214* (2023.01); *G06F 18/217* (2023.01); *G06T 7/0004* (2013.01); *G06T 7/62* (2017.01); *G06T 7/70* (2017.01); *B65G 2201/0264* (2013.01); *G06T 2207/10028* (2013.01); *G06T 2207/30112* (2013.01)

(58) Field of Classification Search
None
See application file for complete search history.

(56) References Cited

U.S. PATENT DOCUMENTS

| | | | | |
|---|---|---|---|---|
| 2010/0280148 A1* | 11/2010 | Webster | ............... | C08G 18/089 524/588 |
| 2011/0218290 A1* | 9/2011 | Webster | ............... | C08F 4/00 524/505 |

OTHER PUBLICATIONS

Bodkhe, et al. "Synthesis and characterization of novel polysiloxane based ABA-type triblock copolymers using ATRP", e-Polymers, 12, p. 1-11, Mar. 26, 2013. (Year: 2013).*
Rahimi, et al. "Amphiphilic zwitterionic-PDMS-based surface modifying additives to tune fouling release of siloxane-polyurethane marine coatings." Progress in Organic Coatings, 149, 105931, Sep. 9, 2020 (Year: 2020).*
Callow et al., "Trends in the Development of Environmentally Friendly Fouling-Resistant Marine Coatings," Nat. Commun., 2011, 2, 244.
Callow et al., "Marine Biofouling: A Sticky Problem," Biologist, 2002, 49(1), 1-5.
Lejars et al., "Fouling Release Coatings: A Nontoxic Alternative to Biocidal Antifouling Coatings," Chem. Rev., 2012, 112(8), 4347-4390.
Magin et al., "Non-toxic Antifouling Strategies," Mater. Today, 2010, 13(4), 36-44.
Konstantinou et al., "Worldwide Occurrence and Effects of Antifouling Paint Booster Biocides in the Aquatic Environment: A Review." Environ. Int., 2004, 30, 235-248.
Wyszogrodzka et al., "Synthesis and Characterization of Glycerol Dendrons, Self-Assembled Monolayers on Gold: A Detailed Study of Their Protein Resistance," Biomacromolecules, 2009, 10(5), 1043-1054.
Yebra et al., "Antifouling Technology—Past, Present and Future Steps Towards Efficient and Environmentally Friendly Antifouling Coatings," Progress in Organic Coatings, 2004, 50, 75-104.
Sommer et al., "A Preliminary Study on the Properties and Foulingrelease Performance of Siloxane-Polyurethane Coatings Prepared from Poly(dimethylsiloxane) (PDMS) Macromers," Biofouling, 2010, 26(8), 961-972.
Iguerb et al., "Antifouling Properties of Poly(methyl methacrylate) Films Grafted with Poly(ethylene glycol) Monoacrylate Immersed in Seawater," Langmuir, 2008, 24(21), 12272-12281.
Heuberger et al., "Interaction Forces and Morphology of a Protein-Resistant Poly(ethylene glycol) Layer," Biophysical Journal, 2005, 88(1), 495-504.
Jeon et al., "Protein-Surface Interactions in the Presence of Polyethylene Oxide," Journal of Colloid and Interface Science, 1991, 142(1), 149-158.
Szleifer et al., "Polymers and Proteins: Interactions at Interfaces," Current Opinion in Solid State and Materials Science, 1997, 2(3), 337-344.
Prime et al., "Adsorption of Proteins onto Surfaces Containing End-Attached Oligo(ethylene oxide): A Model System Using Self-Assembled Monolayers," J. Am. Chem. Soc., 1993, 115(23), 10714-10721.
Galhenage et al., "Poly(ethylene) Glycol-Modified, Amphiphilic, Siloxane- Polyurethane Coatings and Their Performance as Fouling-Release Surfaces," J. Coatings Technol. Res., 2017, 14(2), 307-322.
Jiang et al., "Ultralow-Fouling, Functionalizable, and Hydrolyzable Zwitterionic Materials and Their Derivatives for Biological Applications," Adv. Mater., 2010, 22(9), 920-932.

(Continued)

*Primary Examiner* — Christopher M Rodd
(74) *Attorney, Agent, or Firm* — RAPHAEL BELLUM PLLC; Aaron M. Raphael

(57) ABSTRACT

The invention relates to a curable coating composition comprising at least one surface-modifying amphiphilic additive and at least one siloxane-polyurethane coating composition. The invention also relates to methods of making and using the curable coating composition of the invention. The invention also relates to methods for reducing or preventing biofouling of a surface exposed to an aqueous environment comprising the use of the curable coating composition of the invention.

25 Claims, 14 Drawing Sheets

(56) References Cited

OTHER PUBLICATIONS

Wu et al., "Superhydrophilicity and Spontaneous Spreading on Zwitterionic Surfaces: Carboxybetaine and Sulfobetaine," RSC Adv., 2016, 6, 24827-24834.

Liu et al., "Zwitterionic Modification of Polyurethane Membranes for Enhancing the Anti-Fouling Property,"Journal of Colloid and Interface Science, 2016, 480, 91-101.

Bodkhe et al., "Zwitterionic Siloxane-Polyurethane Fouling-Release Coatings," Progress in Organic Coatings, 2015, 78, 369-380.

Bodkhe et al., "The Effect of Formulation Variables on Fouling-Release Performance of Stratified Siloxane-Polyurethane Coatings," J. Coat. Technol. Res., 2012, 9(3), 235-249.

Bodkhe et al., "Synthesis and Characterization of Novel Polysiloxane Based ABA-Type Triblock Copolymers Using ATRP," e-Polymers, 2013, 12, 1-11.

Stafslien et al., "Combinatorial Materials Research Applied to the Development of New Surface Coatings VI: An Automated Spinning Water Jet Apparatus for the High-Throughput Characterization of Fouling-Release Marine Coatings," Rev. Sci. Instrum., 2007, 78, 072204.

Callow et al., "Efficacy Testing of Nonbiological and Fouling-Release Coatings," Biofouling Methods, John Wiley & Sons, Ltd, 2014, pp. 291-316.

Stafslien et al., "Combinatorial Materials Research Applied to the Development of New Surface Coatings IV. A High-Throughput Bacterial Biofilm Retention and Retraction Assay for Screening Fouling-Release Performance of Coatings," Biofouling, 2007, 23(1), 45-54.

Casse et al., "Laboratory Screening of Coating Libraries for Algal Adhesion," Biofouling, 2007, 23(3/4), 267-276.

Casse et al., "Combinatorial Materials Research Applied to the Development of New Surface Coatings V. Application of a Spinning Water-Jet for the Semi-high Throughput Assessment of the Attachment Strength of Marine Fouling Algae," Biofouling 2007, 23(2), 121-130.

Rittschof et al., "Barnacle Reattachment: A Tool for Studying Barnacle Adhesion," Biofouling, 2008, 24(1), 1-9.

Stafslien et al., "An Improved Laboratory Reattachment Method for the Rapid Assessment of Adult Barnacle Adhesion Strength to Fouling-Release Marine Coatings," J. Coat. Technol. Res., 2012, 9(6), 651-665.

Zhang et al., "Surface Grafted Sulfobetaine Polymers via Atom Transfer Radical Polymerization as Superlow Fouling Coatings," J. Phys. Chem. B, 2006, 110, 10799-10804.

Zhang et al., "Polysulfobetaine-Grafted Surfaces as Environmentally Benign Ultralow Fouling Marine Coatings," Langmuir, 2009, 25(23), 13516-13521.

Wu et al., "Investigation of the Hydration of Nonfouling Material Poly(sulfobetaine methacrylate) by Low-Field Nuclear Magnetic Resonance," Langmuir, 2012, 28, 7436-7441.

Wu et al., "Investigation of the Hydration of Nonfouling Material Poly(ethylene glycol) by Low-Field Nuclear Magnetic Resonance," Langmuir, 2012, 28, 2137-2144.

Jakubowski et al., "Activators Regenerated by Electron Transfer for Atom Transfer Radical Polymerization of Styrene," Macromolecules, 2006, 39, 39-45.

Liaw et al., "Thermal Degradation of Poly[3-dimethyl(methylmethacryloylethyl) Ammonium Propanesulfonate]," J. Appl. Polym. Sci., 1985, 30, 4697-4706.

Min et al., "Use of Ascorbic Acid as Reducing Agent for Synthesis of Well-Defined Polymers by ARGET ATRP," Macromolecules, 2007, 40, 1789-1791.

Kitano et al., "Structure of Water Incorporated in Sulfobetaine Polymer Films as Studied by ATR-FTIR," Macromol. Biosci., 2005, 5, 314-321.

* cited by examiner

AMPHIPHILIC SURFACE-MODIFYING ADDITIVES TO IMPROVE FOULING-RELEASE OF MARINE COATINGS

CROSS-REFERENCE TO RELATED APPLICATIONS

This application claims priority to U.S. Provisional Application No. 62/988,638, filed Mar. 12, 2020, which is incorporated herein by reference.

STATEMENT OF U.S. GOVERNMENT SUPPORT

This invention was made with government support under grant N00014-16-1-3064 awarded by the Office of Naval Research (ONR). The U.S. government has certain rights in the invention.

BACKGROUND OF THE INVENTION

Marine biofouling is the undesirable accumulation of marine micro- and macro-organisms on submerged structures in natural bodies of water.[1] Biofouling imposes a complex problem that not only causes unappealing aesthetic effects, but it also has penalized the marine industry for centuries through significant economic and environmental drawbacks. The estimates report that biofouling costs $1 billion per year to the United States navy alone.[2] The continuous settlement of marine organisms on ships' hulls creates frictional drag, which eventually triggers reduced speed and maneuverability, resulting in increased fuel consumption and carbon emissions.[3] Estimates have shown that even a 2% reduction of ship speed can drop fuel efficiency significantly.[4] A biofouled ship, therefore, should undergo frequent dry docking, enforcing severe economic penalties on ship owners. Additionally, given the global nature of shipping routes, biofouling also threats native environments through transportation of invasive species.[2]

The process of marine biofouling is a complex phenomenon of multiple stages that involves as many as 4000 marine organisms of varying sizes, surface type affinities, and mechanisms of adhesion. The process starts immediately when a structure is immersed in seawater—proteins, nutrients and other small molecules settle on the surface and form a conditioning film. The film provides a highly dynamic condition for marine bacteria as well as slime forming algae (diatoms) to colonize within minutes and form a biofilm. Within a few days after immersion, macro-organisms such as barnacles and mussels tend to settle on the surface, too. Despite marine biofouling being viewed as a linear chain of fouling events, from micro- to macro-organisms, there are macro-foulants, such as barnacle *A. amphitrite* and green algae *U. linza*, that adhere to clean or newly immersed surfaces without the presence of conditioning films, complicating the problem and solution.[1,3]

Historically, ships' hulls made of copper alloys and lead sheaths could contend with biofouling. Even though these systems were effective in antifouling, there were limitations in terms of corrosion of metallic hulls and declining availability of resources in the post medieval era. In the 1900s, antifouling paints with active biocides were widely explored, and eventually introduction of tributyl tin-based self-polishing coatings in the 1970s was found to be very effective against biofouling. However, the paints caused toxicity to non-targeted marine species that was discovered decades later, resulting in a worldwide ban of organotin-based coatings by the International Marine Organization (IMO) due to their harmful effects to aquatic ecosystems.[3,5] Therefore, to address regulations, the focus has been to develop antifouling (AF) coatings and fouling-release (FR) coatings that are non-toxic.

Today, antifouling coatings commonly contain copper oxide-based components that contend with the biofouling issue. Despite copper-based compositions being less toxic than organotin materials, the release of copper into aquatic environments still has the potential to negatively impact marine ecosystems. On the other hand, fouling-release systems offer a completely non-toxic and eco-friendly approach to combat biofouling. FR coatings do not release any chemicals, rather they forbid strong adhesion of marine organisms to surface of structures, which facilitates easy removal of the foulants when subjected to hydrodynamic pressure upon movement of ships or light cleaning.[1,3] As a result, FR systems have remained of special interest to avoid application of biocide-containing paints.

Traditional FR systems are mainly made of elastomeric materials such as polydimethylsiloxane (PDMS), fluoropolymers, or other silicones.[3] These materials are recognized to delay the settlement of foulants especially during idle periods, and thus are explored hugely for non-toxic marine coatings.[6] Additionally, PDMS and materials similar to it possess low surface energy which acts as a driving force for weak adhesion of bio-organisms to them, introducing the fouling release mechanism upon exposure of settled foulants to hydrodynamic pressure.[3] Nevertheless, commercial coatings made of these low surface energy components suffer from mechanical durability and require tie-coat to achieve proper adhesion to a substrate.[3,7] To address issues of durability and tie-coat limitations while ensuring desirable FR performance is met, siloxane-polyurethane (SiPU) FR coatings have been developed that displayed FR performance comparable/better to/than commercially available products with strong adhesion to a substrate and a magnitude higher bulk modulus. The SiPU coatings benefits from combination of two incompatible materials: polyurethane (PU) which is polar with high surface energy and PDMS which is non-polar with low surface energy. The incompatibility causes self-stratification of components where PDMS will travel to the surface tackling biofouling issue and PU remains in contact with the substrate offering durability and strong adhesion.[8,9]

Low surface energy materials such as PDMS are hydrophobic and constitute coatings with hydrophobic characteristics. The hydrophobic FR systems like SiPU can combat the biofouling issue effectively, but there are still marine organisms that can settle firmly on such surfaces. The difference in adherence of foulants to FR coating surfaces is not surprising since the huge number of fouling organisms results in a wide spectrum of surface affinities, from hydrophilic to hydrophobic surfaces, and adhesion mechanisms.[7] For example, *U. linza*, mussels, and barnacles attach strongly to hydrophilic surfaces, while diatoms attach strongly to hydrophobic surfaces and the bacterium *C. lytica* settles on a variety of surfaces. Recent studies have suggested that the primary interaction of marine organisms with surfaces is through the conditioning layer of adsorbed adhesive proteins.[10] Therefore, introduction of hydrophilic moieties to FR coating systems has been explored to improve and tune fouling-release capability of a system against as many organisms as possible.[3]

Hydrophilic protein resistant materials have shown promising results to deter biofouling.[10] Polyethylene glycol (PEG) is one of the commonly investigated materials as it resists protein absorption and possesses non-toxic and non-immunogenic properties. PEG-modified surfaces have shown promising results to deter proteins settlement via the hydrophilic interactions of the surface with water.[11-13] Self-assembled mono-layers (SAM) containing PEG are commonly explored as protein-resistant materials for biomedical applications, but practical application of SAM as marine coatings is not feasible.[14] As a viable approach, PEG-modified amphiphilic siloxane-polyurethane coatings were designed to benefit from properties of PEG, which resulted in broadened performance against more marine organisms.[15] However, PEG experiences rapid autoxidation in presence of available transition metals in the biological and marine environments, appearing as a less suitable candidate for long-term use in marine coatings.[16] Zwitterionic materials are recognized as another major category of hydrophilic protein resistant and ultra-low fouling materials that can bind water molecules even more strongly and offer prolonged stability.[17,18] Phosphobetaine, sulfobetaine, and carboxybetaine are examples of zwitterionic candidates. Sulfobetaine-based polymers have demonstrated promising results in a wide range of applications due to its biomimetic and ultra-low biofouling properties, stability, and commercial availability of the monomer, sulfobetaine methacrylate.[19-22]

This invention involves the addition of surface-modifying amphiphilic additives that can be non-covalently added into a marine coating system, such as SiPU, to tailor its fouling-release properties. Amphiphilic zwitterionic additives are composed of both hydrophilic and hydrophobic segments that are zwitterionic polymers, such as poly(sulfobetaine methacrylate) (poly(SBMA)), and polydimethylsiloxane (PDMS), respectively. An amphiphilic structure for additives was selected for this application to maximize the fouling-release capability of a system against as many organisms as possible. The PDMS segment of such amphiphilic additive facilitates its self-stratification to the interface of coating/air via its incompatibility with coating components and low surface energy to phase separate.[8,9,23] In water, the zwitterionic segment of the additive forms highly hydrated aqueous structure (up to 8 times more than PEG) at the surface.[22,24,25] The hydrated layer will not be readily displaced by marine organisms, limiting their ability to settle on the surface of a coating. It was found that a combination of both PDMS and a zwitterionic polymer formed a coating surface that has both hydrophobic and hydrophilic characteristics, respectively, to combat settlement of organisms.

SUMMARY OF THE INVENTION

The invention relates to a curable coating composition comprising, consisting essentially of, or consisting of: a) at least one surface-modifying amphiphilic additive (SMAA), wherein the SMAA is a block copolymer of poly(dimethylsiloxane) (PDMS) and a zwitterionic polymer; b) at least one polyisocyanate; c) at least one polyol; and d) at least one amine-terminated polydimethyl siloxane (A-PDMS).

The invention also relates to methods of making and using the curable coating composition of the invention.

The invention further relates to objects or substrates coated with the curable coating composition of the invention, which may then be cured to for a coating.

The invention also relates to a cured coating composition of the invention.

The invention also relates to a marine fouling-release coating comprising, consisting essentially of, or consisting of the curable coating composition of the invention.

The invention also relates to a method for reducing or preventing biofouling of a surface exposed to an aqueous environment comprising, consisting essentially of, or consisting of the steps of: (1) coating the surface with the curable coating composition of the invention to form a coated surface, and (2) curing the coating composition on the coated surface.

DESCRIPTION OF THE INVENTION

Figure 1:
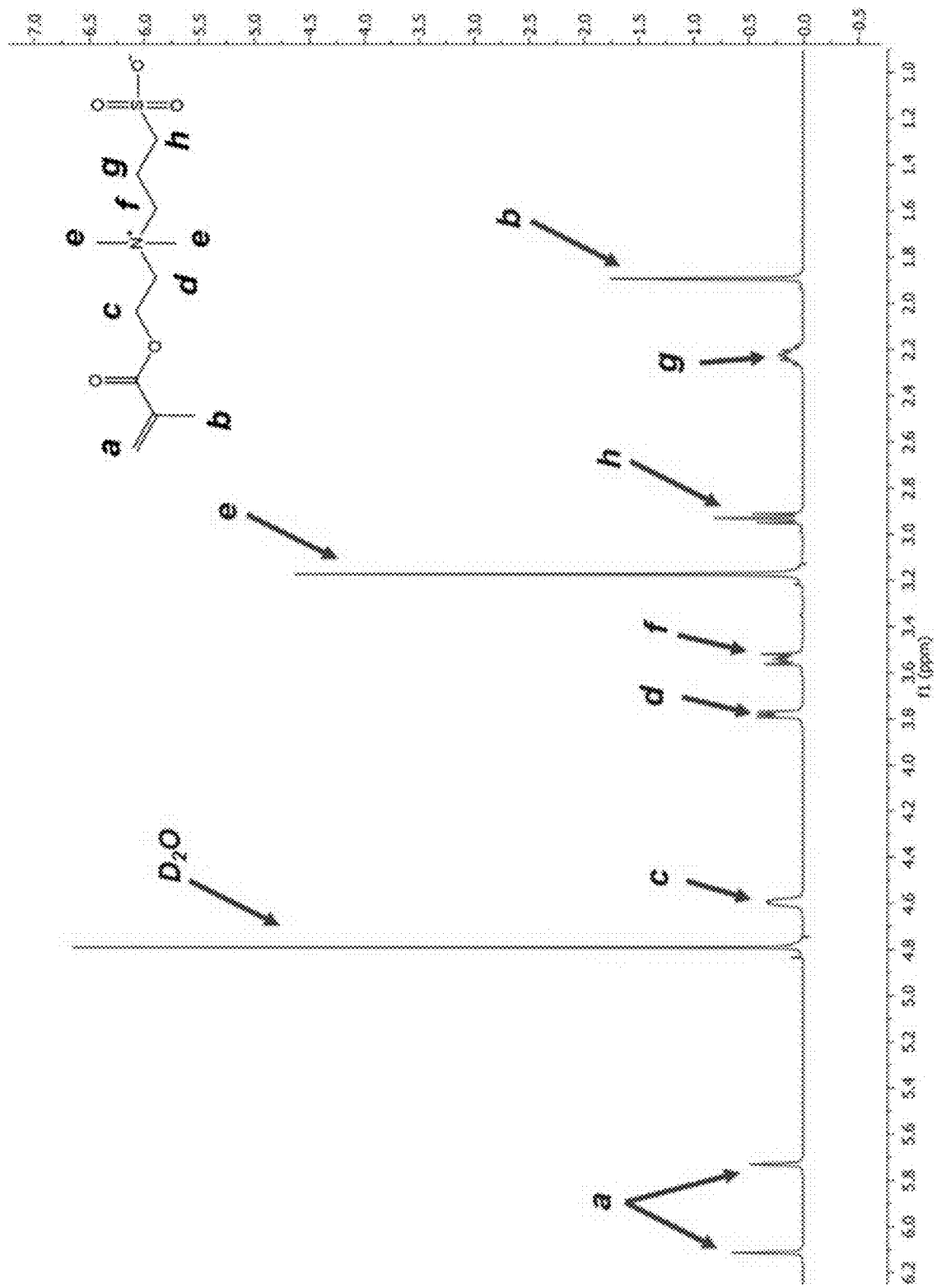
FIG. 1 shows the $^1$H-NMR spectrum of the sulfobetaine methacrylate monomer.

The invention relates to a curable coating composition comprising, consisting essentially of, or consisting of: a) at least one surface-modifying amphiphilic additive (SMAA), wherein the SMAA is a block copolymer of poly(dimethylsiloxane) (PDMS) and a zwitterionic polymer; b) at least one polyisocyanate; c) at least one polyol; and d) at least one amine-terminated polydimethyl siloxane (A-PDMS).

The SMAA, an amphiphilic zwitterionic additive, is a block copolymer (e.g., a diblock copolymer, a triblock copolymer, or mixtures thereof) of PDMS and a zwitterionic polymer. The PDMS may have a molecular weight ranging from 400 to 50,000 g/mol (e.g., 500 to 25,000 g/mol, 800 to 20,000 g/mol, 1000 to 10,000 g/mol). For example, the PDMS may have a molecular weight of 1,000, 5,000, or 10,000 g/mol.

The zwitterionic polymer may comprise, consist essentially of, or consist of sulfobetaine, carboxybetaine, phosphobetaine, or mixtures thereof. The zwitterionic polymer may be prepared from zwitterionic monomers selected from the group consisting of sulfobetaine methacrylate, sulfobetaine acrylate, carboxybetaine methacrylate, carboxybetaine acrylate, and mixtures thereof. Preferably, the zwitterionic polymer is poly(sulfobetaine methacrylate) (poly (SBMA)), which may have a molecular weight ranging from 250 to 10,000 g/mol (e.g., 300 to 7,500 g/mol, 500 to 2,500 g/mol). For example, the poly(SBMA) may have a molecular weight of 500, 1000, or 2,500 g/mol.

The SMAA may be prepared by Atom Transfer Radical Polymerization (ATRP). See Matyjaszewski, *Macromolecules* 2012, 45, 4015-4039, which is incorporated herein by reference. Preferably, the SMAA is prepared by Activators ReGenerated by Electron Transfer—Atom Transfer Radical Polymerization (ARGET ATRP). The SMAA may comprise, consist essentially of, or consist of the reaction product of at least one halogen-functional PDMS macroinitiator and a zwitterionic monomer. The reaction may further comprise, consist essentially of, or consist of at least one transition metal catalyst (e.g., Cu(II)Cl$_2$), at least one reducing agent (e.g., ascorbic acid), at least one ligand (e.g., 2,2'-bypyridine), and at least one solvent (e.g., water and/or methanol). The halogen-functional PDMS macroinitiator may be prepared by converting a mono- or a di-functional carbinol terminated PDMS into the halogen-functional PDMS macroinitiator. Therefore, the SMAA may be prepared by converting a mono- or di-functional carbinol terminated PDMS into a halogen-functional PDMS macroinitiator, and then polymerizing the halogen-functional PDMS macroinitiator with a zwitterionic monomer using atom-transfer radical polymerization (ATRP). For example, a SMAA may be prepared by reacting a mono- or a di-functional carbinol terminated PDMS with α-bromoisobutyryl bromide to form a mono- or a di-bromo-terminated PDMS, which may then be polymerized with a zwitterionic monomer, such as poly (sulfobetaine methacrylate). As discussed above, the SMAA may also be prepared in the presence of a transition metal catalyst (e.g. Cu(II)Cl$_2$), a ligand (e.g., 2,2'-bypyridine), a reducing agent (e.g., ascorbic acid), and a solvent (e.g., water and/or methanol). The ratio of zwitterionic monomer: halogen-functional PDMS macroinitiator:transition metal catalyst:reducing agent:ligand:solvent may be 100:0.2:0.01: 0.05:0.15.

The mono-functional carbinol terminated PDMS may have the following structure:

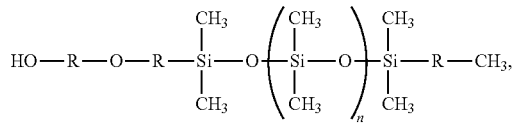

or

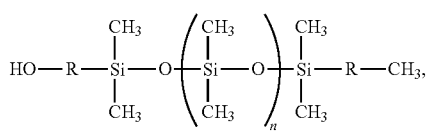

and the di-functional carbinol terminated PDMS may have the following structure:

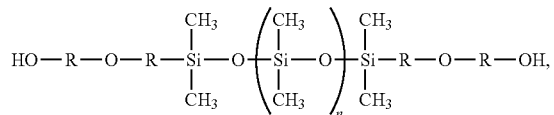

or

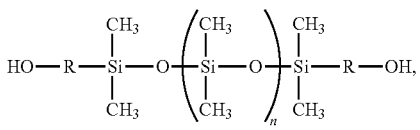

wherein R, independent of one another, is a $C_3$-$C_{12}$ straight chain alkyl or an alkylene ether; and wherein n ranges from 0 to about 270.

As discussed above, the PDMS used in the SMAA may have a functionality of one or two, resulting in additives having an ABA copolymer structure (i.e., three blocks) or an AB copolymer structure (i.e., two blocks), respectively.

Besides the SMAA, the curable coating compositions of the invention further comprise, consist essentially of, or consist of a siloxane-polyurethane coating composition. The siloxane-polyurethane coating composition comprises, consists essentially of, or consists of at least one polyisocyanate, at least one polyol, and at least one A-PDMS. Exemplary siloxane-polyurethane coating compositions that can be used in the invention are disclosed in U.S. Pat. Nos. 7,989, 074; 8,299,200; 8,604,152; 9,169,359; WO 2016/196565, each of which is incorporated herein by reference.

The polyisocyanate may be selected from the group consisting of an aliphatic polyisocyanate, a cycloaliphatic polyisocyanate, an araliphatic polyisocyanate, an aromatic polyisocyanate, and mixtures thereof. For example, the polyisocyanate may be selected from the group consisting of:

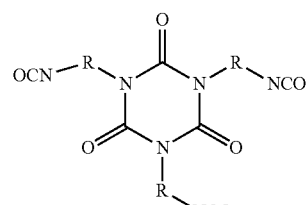

(I)

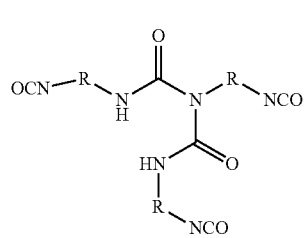

(II)

wherein R is independently an optionally substituted, divalent $C_1$-$C_{15}$ alkyl, an optionally substituted $C_3$-$C_{15}$ cycloalkyl, or a group selected from:

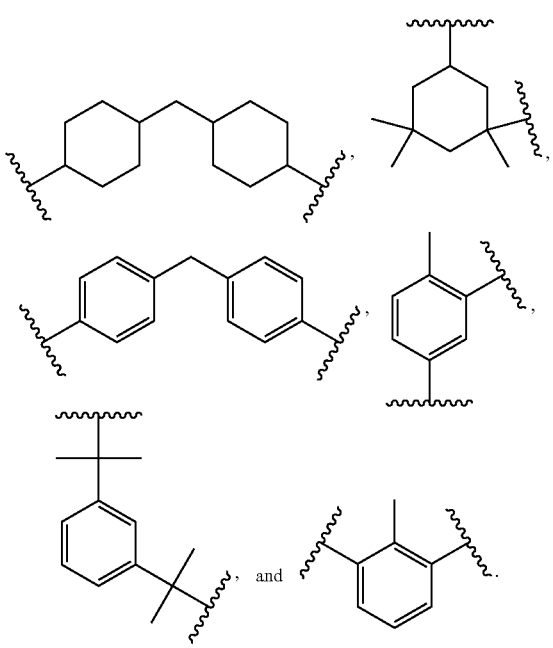

Preferably, R is a $C_2$-$C_{10}$ straight chain or branched alkyl.

Polyisocyanates based on methylene diphenyl diisocyanate ("MDI") and trimers thereof, hexamethylene diisocyanate ("HMDI") and trimers thereof, isophorone diisocyanate ("IPDI") and trimers thereof, and the like can be used. Preferably, the polyisocyanate is an isophorone-based polyisocyanate. The polyisocyanate may be a polyisocyanate having at least three isocyanate groups such as an MDI trimer, an IPDI trimer (Desmodur Z4470 BA), and an HDI trimer (Desmodur N3300 A). Other polyisocyanates known in the art may also be used. Examples include Desmodur HL, Desmodur IL, triisocyanatononane, Desmodur RE, Desmodur RFE.

The polyol may be selected from the group consisting of polyester polyols, polyether polyols, polycarbonate polyols, acrylic polyols, and mixtures thereof. Preferably, the polyol is an acrylic polyol. The polyol may include polyol having at least three hydroxyl groups. A mixture of polyols can also be used in formulating a polyurethane coating. Polyester polyols can include those made from the melt polycondensation of polyfunctional acids with polyfunctional alcohols or those made from the ring opening polymerization of cyclic monomers such as epsilon-caprolactone. Examples of suitable polyester polyols include, for example, poly(caprolactone) polyols, poly(hexamethylene adipate), and the like. Examples of suitable polyether polyols include, for example, poly(ethyleneglycol), poly(propylene glycol), poly(butylene glycol), poly(tetramethylene oxide), and the like. Acrylic polyols may be synthesized, typically by free radical polymerization, from a mixture of at least one hydroxy functional monomer plus one or more non-functional monomers. Suitable hydroxy-functional monomers include, for example, hydroxyethyl acrylate, hydroxyethyl methacrylate, hydroxypropyl acrylate, hydroxypropyl methacrylate, and the like. Examples of non-functional monomers include, for example, styrene, methyl methacrylate, methyl acrylate, butyl methacrylate, butyl acrylate, lauryl methacrylate, lauryl acrylate, 2-ethylhexyl acrylate, 2-ethyl hexyl methacrylate, and the like. The acrylic polyol may be synthesized in solution using a thermally-activated free radical initiator. The polyol can be synthesized in either a batch, semi-batch or continuous process. Examples of free radical initiators are benzoyl peroxide, t-amyl peroxy-2-ethylhexanoate, t-butyl hydroperoxide, di-t-butyl peroxide, azobisisobutyronitrile, azobisisovaleronitrile, and the like. The acrylic polyol may be made by free radical polymerization and then diluted in a solvent, such as toluene, xylene, methylisobutyl ketone, and the like. The polyol may include a polycaprolactone polyol such as a polycaprolactone triol. One example of an acrylic polyol for use in a coating composition of the invention is an acrylic polyol composed of 80% butyl acrylate and 20% 2-hydroxy ethyl acrylate by weight.

The polyol used in the siloxane-polyurethane coating composition may also not be an acrylic polyol or a polyether polyol.

The A-PDMS may be at least one aminopropyl-terminated PDMS.

In a preferred curable coating composition of the invention, the SMAA is a block copolymer of PDMS and poly(sulfobetaine methacrylate), the polyisocyanate is a polyisocyanate derived from isophorone diisocyanate, the polyol is an acrylic polyol composed of 80% butyl acrylate and 20% 2-hydroxyethyl acrylate, and the A-PDMS is an aminopropyl-terminated PDMS.

The SMAAs of the invention may be incorporated into the siloxane-polyurethane coating composition in an amount ranging from 0.1-20 wt. % (based on the amount of non-volatile components in the curable coating composition), such as, for example, 0.2, 1, 5, or 10 wt. %.

The curable coating compositions of the invention may also contain catalysts for crosslinking. Catalysts for the crosslinking of the curable coating compositions can be either organometallic complexes or organic bases, and other such catalysts known in the art. Examples of organometallic compounds are dibutyl tin dilaurate, dibutyl tin diacetate, bismuth carboxylate, and compounds of zirconium and aluminum such as K-Kat 4205, K-Kat-5218, and K-Kat-XC-6212. Examples of organic base catalysts are sold under the DABCO trade name by Air Products. DABCO is 1,4-diazabicyclo[2.2.2]octane. Suitable examples of isocyanate reaction catalysts include diethyl tin diacetate, dibuyltin diacetate, dibutyltin dilaurate, dibutyltin maleate, dilauryltin diacetate, dioctyltin diacetate, or a mixture thereof. In one embodiment the isocyanate reaction catalyst includes a tin catalyst. The curable coating compositions may also be formulated with or without solvents.

The curable coating compositions of the invention may be a solvent-free coating composition or may optionally contain a solvent such as, for example, acetone, THF, methyl ethyl ketone (MEK), xylene, acetone, acetylacetone, benzene, toluene, methyl amyl ketone (MAK), methyl isobutyl ketone, butyl acetate, t-butyl acetate, ethyl 3-ethoxypropionate (EEP), isopropanol, aromatic 100, aromatic 150, tetrahydrofuran, diethyl ether, butanol, butoxyethanol, etc. The curable coating compositions may be a solution in such a solvent or mixture of solvents.

The curable coating compositions may also include a pot life extender, such as, for example, alkane-2,4-dione (e.g., 2,4-pentadione), N,N-dialkyl acetoacetamide, alkyl acetoacetate, and the like. These, and the other common additives discussed below, may be included in amounts known in the art for their use.

The curable coating compositions of the invention may further contain a pigment (organic or inorganic), if a coating having a particular color is desired, and/or additives and fillers known in the art. For example, the curable coating compositions of the invention may further contain coating additives. Examples of such coating additives include, but are not limited to, one or more leveling, rheology, and flow control agents such as silicones, fluorocarbons, or celluloscs; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides, and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

The invention also relates to methods of making the curable coating compositions of the invention comprising, consisting essentially of, or consisting of combining the at least one SMAA, the at least one polyisocyanate, the at least one polyol, and the at least one A-PDMS.

The invention also relates to the use of the curable coating compositions of the invention which may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. The invention further relates to an article of manufacture or object (e.g., a boat hull) comprising the curable coating compositions of the invention.

The curable coating compositions of the invention may be cured at room temperature (ambient cure) or at elevated temperatures (thermal cure).

The invention also relates to a method for reducing or preventing biofouling of a surface exposed to an aqueous environment comprising the steps of: coating the surface with the curable coating compositions to form a coated surface, and curing the coating composition on the coated surface.

The invention also relates to a marine fouling-release coating comprising the curable coating compositions.

EXAMPLES

The SMAA were synthesized via ARGET ATRP (Activators ReGenerated by Electron Transfer—Atom Transfer Radical Polymerization), which provided the advantage to control chain length of the zwitterionic polymer on each side of PDMS block.[26,27] Thus, the SMAA had an AB or ABA block copolymer structure that can ideally self-stratify to the coating/water interface. After synthesis of projected additives was completed, they were added to SiPU marine coating, formulation A4-20, to assess their effect on fouling-release performance. A4-20 coating is composed of acrylic polyol (80% butyl acrylate; 20% hydroxyl ethyl acrylate) in 50% toluene, isocyanate (IPDI trimer), A-PDMS, catalyst (dibutyltin dilaurate) and potlife extender.[23] Additives were the variable factor and the A4-20 formulation was the constant factor. The surface properties of formulated coatings were measured with water contact angle (WCA) and methylene iodide contact angle (MICA) and characterized with atomic force microscopy (AFM) tools. The fouling-release performance of the coatings was evaluated via a range of laboratory assays including bacteria (*Cellulophaga lytica*), diatom (*Navicula incerta*), and barnacle (*Amphibalanus amphitrite*). The coatings performance under biological assays was compared with Silastic® T2, polyurethane (PU), and a series of Intersleek® products.

Materials

Desmodur Z4470 BA (isophorone diisocyanate-based polyisocyanate (IPDI)) was provided by Covestro LLC. Monofunctional carbinol terminated polydimethyl siloxane (PDMS) and difunctional carbinol terminated PDMS were purchased from Gelest Inc. 2-(Dimethylamino) ethyl methacrylate, 1,3-propane sultone, copper (II) chloride, ascorbic acid (vitamin C), 2,2'-bipyridine, α-bromoisobutyryl bromide (BIBB), and triethylamine were purchased from Sigma Aldrich. Also, solvents including tetrahydrofuran (THF), toluene, chloroform, acetone, acetylacetone, and methyl amyl ketone (MAK), with drying molecular sieves were purchased from Sigma Aldrich. An acrylic polyol composed of 80% butyl acrylate and 20% 2-hydroxyethyl acrylate was synthesized via conventional free radical polymerization and diluted to 50% with toluene. Aminopropyl terminated polydimethyl siloxane (APT-PDMS) with molecular weight 20000 g/mole was also synthesized through a ring-opening equilibration reaction. Detailed descriptions of synthesis procedures for both acrylic polyol and APT-PDMS can be found elsewhere.[23]

AkzoNobel International Paint provided the commercial FR standards Intersleek® 700 (IS 700), Intersleek® 900 (IS 900), and Intersleek® 1100SR (IS 1100) commercial FR coatings. Silicone elastomer, Silastic® T2 (T2) was provided by Dow Corning. Aluminum panels (4×8 in., 0.6 mm thick, type A, alloy 3003 H14) purchased from 0-lab were sand blasted and primed with Intergard 264 using air-assisted spray application. Multi-well plates were modified using circular disks (1-inch diameter) of primed aluminum.

Synthesis of Sulfobetaine Methacrylate (SBMA) Monomer

In a 250-mL one-neck round bottom flask equipped with a magnetic stirrer and a thermocouple, 2-(dimethylamino) ethyl methacrylate (30.0 g; 0.19 mole) and acetone (90.0 mL) were charged, and the contents were stirred at 30° C. A solution of 1,3-propane sultone (23.3 g; 0.19 mole) and acetone (10 mL) was added dropwise in 30 minutes to the flask. After the addition of the solution, the reaction was stirred at 30° C. for four hours and then allowed to stand at room temperature for one week. The monomer precipitated out as white crystals and was collected by filtration, washed with dry acetone three times, and dried under vacuum overnight to obtain sulfobetaine methacrylate.[28] Schematic of the synthesis of SBMA is shown in Scheme 1. The product was confirmed by proton nuclear magnetic resonance ($^1$H-NMR) and Fourier transform infrared spectroscopy (FTIR).

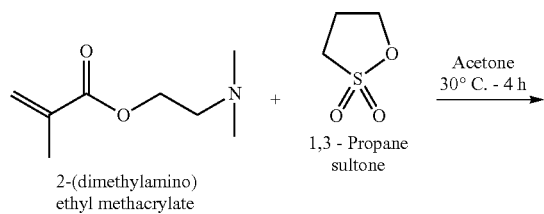

2-(dimethylamino) ethyl methacrylate 1,3 - Propane sultone were stirred at 0-5° C. A solution of α-bromoisobutyryl bromide (BIBB) and 10 mL THF was added dropwise to the flask while maintaining the temperature at 0-5° C. After the addition of the solution, the reaction was stirred at room temperature overnight. Next, formed white precipitates were removed using a fritted funnel, and solvent was removed under vacuum. Then, 100 mL of dichloromethane was added to the condensed contents, and they were washed with water 3 times (100 mL each time). The organic layer was collected, dried over MgSO$_4$, filtered, condensed in a rotary evaporator, and dried in vacuo overnight. The synthesized macroinitiator was characterized by $^1$H-NMR and FTIR.[26]

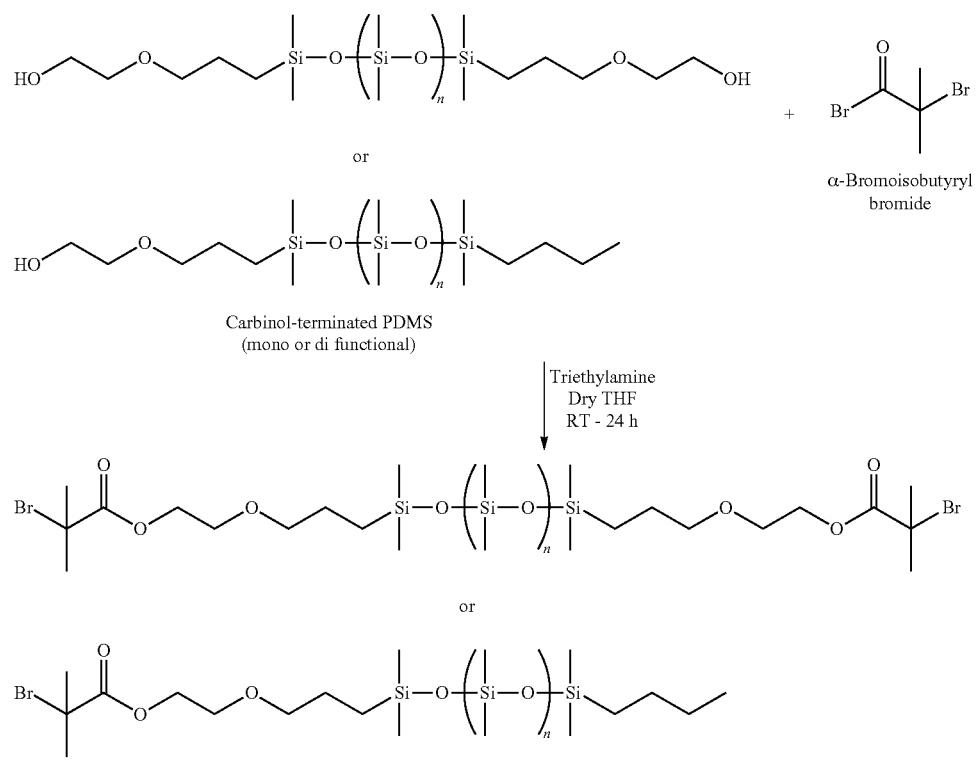

Carbinol-terminated PDMS (mono or di functional)

α-Bromoisobutyryl bromide

Triethylamine
Dry THF
RT - 24 h

-continued

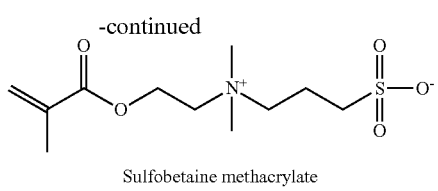

Sulfobetaine methacrylate

Scheme 1. Synthesis of SBMA Monomer

Synthesis of ARGET-ATRP Macroinitiator (Br-Terminated PDMS)

The mole ratio of PDMS:triethylamine:BIBB was 1:2:2.3 and 1:1:1.16 for mono-functional PDMS and di-functional PDMS, respectively. Schematic of reaction is shown in Scheme 2. In a 500-mL three-neck round bottom flask equipped with an addition funnel, magnetic stirrer, and thermocouple, carbinol-terminated PDMS and triethylamine were dissolved in 200 mL dry tetrahydrofuran (THF) solvent. The flask was placed in an ice bath and the contents Scheme 2. Synthesis of Br-PDMS Macroinitiator Synthesis of Amphiphilic Additives Amphiphilic additives that contained zwitterionic poly (SBMA) block(s) and PDMS block were synthesized through ARGET-ATRP technique.[27,29] This polymerization technique allows synthesis of polymers with targeted chain lengths, requires negligible catalyst content (ppm concentration), and utilizes vitamin C (ascorbic acid) as a reducing agent. Also, there is no need for a glove box to run this polymerization since the catalyst precursor is more stable for ARGET ATRP than conventional ATRP. ARGET-ATRP requires solvent plus five components including monomer, macroinitiator, catalyst, reducing agent, and a ligand:sulfobetaine methacrylate (SBMA), Br-terminated PDMS, Cu(II) Cl, vitamin C (ascorbic acid), and 2,2'-bypyridine, respectively. The ratio of $[SBMA]_0/[Br\text{-}PDMS\text{-}Br]_0/[CuCl_2]_0/[bpy]_0/[Vitamin\ C]_0$ for the polymerization is 100/0.2/0.01/0.05/0.15. For example, to synthesize 10 gr of SBMA monomer with target MW of 5000 (2500 on each side of di-functional PDMS macroinitiator with ~1000 MW), the ratio of reagents will be in mg as 10000/2596/13/78/264. The schematic of the reaction is illustrated in Scheme 4. In a 100-mL one-neck round bottom flask equipped with a magnetic stirrer, ATRP PDMS macroinitiator and 40 mL methanol was charged, and stirred at room temperature. A solution of SBMA monomer dissolved in 5 mL methanol was added to the flask. The contents were stirred for 5 minutes to obtain a homogenous mixture. A solution of 2,2'-bypyridine and Cu(II) Cl in 5 mL methanol was added to the flask. The flask was sealed, and a flow of nitrogen gas was injected into the flask for 30 seconds. A solution of ascorbic acid in 2 mL water was injected into the flask using a syringe to initiate polymerization reaction. The reaction was stirred at room temperature for 48 hours. After this time, the polymer precipitated in methanol. The solvent was removed by a rotary evaporator. Then, as the amphiphilic product is not soluble in water or common organic solvents, the contents were washed with both water and dichloromethane 3 times (50 mL each time). The remaining residual solvent was removed by rotary evaporator and product was dried in vacuo at 40° C. overnight. The synthesized macroinitiator was characterized by $^1$H-NMR and FTIR.

Scheme 3. Synthesis of Amphiphilic Copolymeric Additive Via ARGET ATRP Polymerization Method Also, poly(SBMA) with no PDMS in the backbone was synthesized as another control additive to compare results with. BIBB initiator was used instead of Br-terminated PDMS macroinitiator. The above procedure was followed for this synthesis too.

Coating Formulations

Coating formulations were prepared by adding acrylic polyol and SMAA additive in a vial, sonicated for 15 minutes and magnetically stirred at ambient condition for 24 hours. APT-PDMS and acetylacetone (potlife extender) were added to the vial. The mixture was sonicated for 15 minutes and was magnetically stirred at ambient condition for another 24 hours. IPDI resin and catalyst solution were added to the vial, and the mixture was stirred for another hour. After mixing, coating formulations were deposited into multi-well plates using an automatic repeat pipette (250 μL of formulation was deposited into each well in multi-well plate). Drawdowns were made on primed 8"×4" aluminum panels using a wire-wound drawdown bar with a wet film thickness of 80 μm. All coatings were allowed to cure under ambient conditions for 24 hrs followed by oven curing at 80° C. for 45 min. Table 1 illustrates a formulation with 1% wt. additive (compared to overall nonvolatile contents).

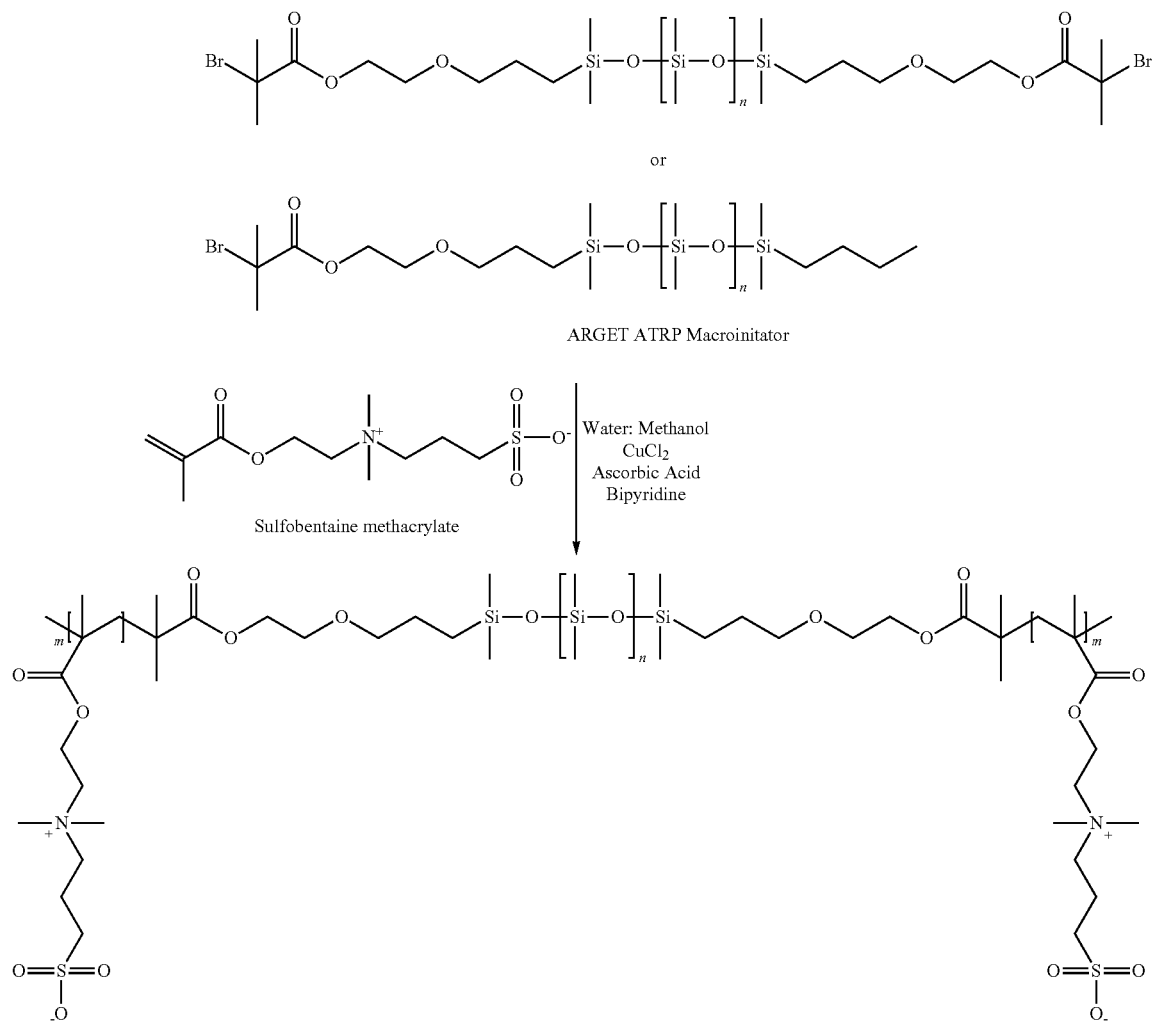

ARGET ATRP Macroinitator

Sulfobentaine methacrylate

Water: Methanol
CuCl$_2$
Ascorbic Acid
Bipyridine

TABLE 1

General Components for a coating formulation

| Component | MW (g/mol) | Amount (g) | Wt. % | Eq. Wt. (g/eq) | Eq NCO:AP 1.05:1.0 | % Solids | Amount Required (g) |
|---|---|---|---|---|---|---|---|
| Acrylic Polyol | | 8.0000 | | 580 | | 47.88 | 16.7084 |
| APT-PDMS | 20000 | 3.3417 | 20 | 10000 | | 100 | 3.3417 |
| Acetylacetone | | 1.6541 | 10 | | | 100 | 1.6541 |
| SMAA Additive | | 0.1654 | 1 | | | 100 | 0.1654 |
| NCO Resin (Desmodur Z4470BA) | | 5.1989 | | 358.97 | 0.014482759 | 70.2 | 7.4058 |
| Catalyst (DBTDAc 1 wt. % in MEK) | | 0.0066 | 0.04 | | | 1 | 0.6616 |
| Total Formulation Weight (g) | | | | | | | 29.937 |

Experimental Design

The experiment was designed to assess 12 additives (Table 2). Four variables were evaluated to establish an initial understanding and correlation between a designed additive and fouling-release performance. The variables were PDMS average molecular weight (1000, 5000, 10000), PDMS functionality (1 vs 2), poly(SBMA) molecular weight (500, 1000, 2500), and addition amount to a coating (0.2, 1, and 5 wt. % in relation to non-volatile coating ingredients). Two SMAAs were also added at 10 wt. %. Thus, a total of 43 coatings were formulated. The details of the formulations are tabulated in Table 3.

TABLE 2

Synthesized copolymeric additives

| ABA Type Additive | AB Type Additive |
|---|---|
| PSBMA 500-PDMS 1000-PSBMA 500 | PSBMA 500-PDMS 1000 |
| PSBMA 1000-PDMS 1000-PSBMA 1000 | PSBMA 1000-PDMS 1000 |
| PSBMA 2500-PDMS 1000-PSBMA 2500 | PSBMA 2500-PDMS 1000 |
| PSBMA 500-PDMS 5000-PSBMA 500 | |
| PSBMA 1000-PDMS 5000-PSBMA 1000 | |
| PSBMA 2500-PDMS 5000-PSBMA 2500 | |
| PSBMA 500-PDMS 10,000-PSBMA 500 | |
| PSBMA 1000-PDMS 10,000-PSBMA 1000 | |
| PSBMA 2500-PDMS 10,000-PSBMA 2500 | |

TABLE 3

Formulated coatings

| Formulation Title | Assigned ID Number | Blocks | PDMS (MW) | SBMA (MW) | % Additive |
|---|---|---|---|---|---|
| ARR-2-88 A4-20 | 1 | | | | |
| ARR-2-92 500-1k 0.2% | 2 | 2 | 1000 | 500 | 0.2 |
| ARR-2-92 500-1k 1.0% | 3 | 2 | 1000 | 500 | 1 |
| ARR-2-92 500-1k 5.0% | 4 | 2 | 1000 | 500 | 5 |
| ARR-2-94 1k-1k 0.2% | 5 | 2 | 1000 | 1000 | 0.2 |
| ARR-2-94 1k-1k 1% | 6 | 2 | 1000 | 1000 | 1 |
| ARR-2-94 1k-1k 5% | 7 | 2 | 1000 | 1000 | 5 |
| ARR-2-96 2.5k-1k 0.2% | 8 | 2 | 1000 | 2500 | 0.2 |
| ARR-2-96 2.5k-1k 1% | 9 | 2 | 1000 | 2500 | 1 |
| ARR-2-96 2.5k-1k 5% | 10 | 2 | 1000 | 2500 | 5 |
| ARR-2-98 500-1k-500 0.2% | 11 | 3 | 1000 | 1000 | 0.2 |
| ARR-2-98 500-1k-500 1% | 12 | 3 | 1000 | 1000 | 1 |
| ARR-2-98 500-1k-500 5% | 13 | 3 | 1000 | 1000 | 5 |
| ARR-2-100 1k-1k-1k 0.2% | 14 | 3 | 1000 | 2000 | 0.2 |
| ARR-2-100 1k-1k-1k 1% | 15 | 3 | 1000 | 2000 | 1 |
| ARR-2-100 1k-1k-1k 5% | 16 | 3 | 1000 | 2000 | 5 |
| ARR-2-102 2.5k-1k-2.5k 0.2% | 17 | 3 | 1000 | 5000 | 0.2 |
| ARR-2-102 2.5k-1k-2.5k 1% | 18 | 3 | 1000 | 5000 | 1 |
| ARR-2-102 2.5k-1k-2.5k 5% | 19 | 3 | 1000 | 5000 | 5 |
| ARR-2-104 500-5k-500 0.2% | 20 | 3 | 5000 | 1000 | 0.2 |
| ARR-2-104 500-5k-500 1% | 21 | 3 | 5000 | 1000 | 1 |
| ARR-2-106 1k-5k-1k 0.2% | 22 | 3 | 5000 | 2000 | 0.2 |
| ARR-2-106 1k-5k-1k 1% | 23 | 3 | 5000 | 2000 | 1 |
| ARR-2-106 1k-5k-1k 5% | 24 | 3 | 5000 | 2000 | 5 |
| ARR-2-108 2.5k-5k-2.5k 0.2% | 25 | 3 | 5000 | 5000 | 0.2 |
| ARR-2-108 2.5k-5k-2.5k 1% | 26 | 3 | 5000 | 5000 | 1 |
| ARR-2-108 2.5k-5k-2.5k 5% | 27 | 3 | 5000 | 5000 | 5 |
| ARR-2-110 500-10k-500 0.2% | 28 | 3 | 10000 | 1000 | 0.2 |
| ARR-2-110 500-10k-500 1% | 29 | 3 | 10000 | 1000 | 1 |
| ARR-2-110 500-10k-500 5% | 30 | 3 | 10000 | 1000 | 5 |
| ARR-2-112 1k-10k-1k 0.2% | 31 | 3 | 10000 | 2000 | 0.2 |
| ARR-2-112 1k-10k-1k 1% | 32 | 3 | 10000 | 2000 | 1 |
| ARR-2-112 1k-10k-1k 5% | 33 | 3 | 10000 | 2000 | 5 |
| ARR-2-114 2.5k-10k-2.5k 0.2% | 34 | 3 | 10000 | 5000 | 0.2 |
| ARR-2-114 2.5k-10k-2.5k 1% | 35 | 3 | 10000 | 5000 | 1 |
| ARR-2-114 2.5k-10k-2.5k 5% | 36 | 3 | 10000 | 5000 | 5 |
| ARR-2-116 2.5k-1k 10% | 37 | 2 | 1000 | 2500 | 10 |
| ARR-2-116 2.5k-1k-2.5k 10% | 38 | 3 | 1000 | 5000 | 10 |
| ARR-2-118 all di-block 1% w 1k PDMS | 39 | 2 | | | 1 |
| ARR-2-118 all tri-block 1% w 1k PDMS | 40 | 3 | | | 1 |
| ARR-2-120 p(SBMA) 0.2% | 41 | 1 | 0 | 5000 | 0.2 |
| ARR-2-120 p(SBMA) 1% | 42 | 1 | 0 | 5000 | 1 |
| ARR-2-120 p(SBMA) 5% | 43 | 1 | 0 | 5000 | 5 |

Control and Standard Coatings

Commercial standards were prepared following manufacturer's specifications. Control SiPU A4-20 was prepared following the procedure outlined in a previous study. 23 Also, pure poly(SBMA) was added to the A4-20 system as a control additive in reference to the other additives. Similar to experimental coatings all control and standards were also prepared on 8"×4" primed aluminum panels and multi-well plates. Table 4 contains detailed descriptions of the control and standard coatings used for this experiment.

TABLE 4

List of Control Coatings

| Control Name | Control ID | Description |
|---|---|---|
| A4-20% | 1 | Internal Si-PU FR Control |
| NDSU-PU | PU | Pure Polyurethane Standard |
| Dow T2 | T2 | Silicone Elastomer Standard |
| IS 700 | 700 | Intersleek Commercial FR Standard |
| IS 900 | 900 | Intersleek Commercial FR Standard |
| IS 1100 | 1100 SR | Intersleek Commercial FR Standard |
| ARR-2-120 p(SBMA) 0.2% | 41 | Internal Si-PU Control with p(SBMA) 0.2% wt. additive |
| ARR-2-120 p(SBMA) 1% | 42 | Internal Si-PU Control with p(SBMA) 1% wt. additive |
| ARR-2-120 p(SBMA) 5% | 43 | Internal Si-PU Control with p(SBMA) 5% wt. additive |

Water Contact Angle Measurements

All experimental coatings were characterized using water contact angles (WCA) using the Symyx® surface energy system prior to water aging. The WCAs of coatings were obtained at 0, 3, 6, 9, and 15 min time intervals. Three measurements of WCA were obtained using First Ten Angstroms' software. Then average WCA for each time was recorded with standard deviation of the mean. Similarly, WCAs of internal standards was measured.

Water Aging

All the coatings were pre-leached for 28 days in running tap water. Coated multi-well plates and panels were placed in a tap-water aquarium system equipped with automated filling/emptying capability where the tank water was emptied and refilled every 4 hrs.

Biological Laboratory Assays

Bacterial (*Cellulophaga lytica*) Biofilm Adhesion

Fouling-release properties towards bacteria was evaluated using retention and adhesion assays described previously.[30-32] A suspension consisting of the marine bacterium *Cellulophaga lytica* at $10^7$ cells/mL concentration in artificial seawater (ASW) containing 0.5 g/L peptone and 0.1 g/L yeast extract was deposited in to 24-well plates (1 mL/well). The plates were then incubated statically at 28° C. for 24 hours. The ASW growth medium was then removed and the coatings were subjected to water-jet treatments. The first column of each coating (3 replicate wells) was not treated and served as the initial amount of bacterial biofilm growth. The second column (3 replicate wells) was subjected to water-jetting at 10 psi for 5 seconds. Following water-jet treatments, the coating surfaces were stained with 0.5 mL of a crystal violet solution (0.3 wt. % in deionized water) for 15 minutes and then rinsed three times with deionized water. After 1 hour of drying at ambient laboratory conditions, the crystal violet dye was extracted from the coating surfaces by adding 0.5 mL of 33% acetic acid solution for 15 minutes. The resulting eluates were transferred to a 96-well plate (0.15 mL/coating replicate) and subjected to absorbance measurements at 600 nm wavelength using a multi-well plate spectrophotometer. The absorbance values were considered to be directly proportional to the amount of bacterial biofilm present on coating surfaces before and after water-jetting treatments. Percent removal of bacterial biofilm was quantified by comparing the mean absorbance values of the non-jetted and water-jetted coating surfaces. 33

Growth and Release of Microalgae (*Navicula Incerta*)

Laboratory biological assay to evaluate FR properties of coatings towards diatom (*Navicula incerta*) was conducted at NDSU following a similar procedure described previously.[31,34] Briefly, a suspension with $4 \times 10^5$ cells/mL of *N. incerta* (adjusted to 0.03 OD at absorbance 660 nm) in Guillard's F/2 medium was deposited into each well (1 mL per well) and cell attachment was stimulated by static incubation for 2 hours under ambient conditions in the dark. Coating surfaces were then subjected to water-jet treatments.[30] First column of wells (3 wells) were not water-jetted so that initial cell attachment could be determined and the next column of wells (3 wells) were water-jetted at 20 psi for 10 seconds. Microalgae biomass was quantified by extracting chlorophyll using 0.5 mL of DMSO and measuring fluorescence of the transferred extracts at an excitation wavelength of 360 nm and emission wavelength at 670 nm. The relative fluorescence (RFU) measured from the extracts was considered to be directly proportional to the biomass remaining on the coating surfaces after water-jetting. Percent removal of attached microalgae was determined using relative fluorescence of non-jetted and water-jetted wells.

Adult Barnacle (*Amphibalanus Amphitrite*) Adhesion

An adult barnacle reattachment and adhesion assay was used to evaluate the fouling-release properties of the coatings towards macrofoulers.[35,36] Coatings prepared on 8×4" panels after water aging were utilized for this laboratory assay. Barnacles were dislodged from silicone substrates sent from Duke University and immobilized on experimental coatings (6 barnacles per coating) using a custom-designed immobilization template. The immobilized barnacles were allowed to reattach and grow for 2 weeks while immersed in an ASW aquarium tank system with daily feedings of brine shrimp Anemia nauplii (Florida Aqua Farms). After the 2-week attachment period, the number of non-attached barnacles was recorded, and the attached barnacles were pushed off (in shear) using a hand-held force gauge mounted onto a semi-automated stage. Once the barnacles were dislodged, their basal plate areas were determined from scanned images using Sigma Scan Pro 5.0 software program. Barnacle adhesion strength (MPa) was calculated by taking the ratio of peak force of removal to the basal plate area for each reattached barnacle. The average barnacle adhesion strength for each coating was reported as a function of the number of barnacles released with a measurable force and that exhibited no visible damage to the basis or shell plates.

Results/Characterization:

Amphiphilic additives that contained zwitterionic poly (SBMA) block(s) and PDMS block were synthesized through ARGET-ATRP technique. ARGET-ATRP requires solvent plus five components including monomer, macroinitiator, catalyst, reducing agent, and a ligand:sulfobetaine methacrylate (SBMA), Br-terminated PDMS, Cu(II) Cl, vitamin C (ascorbic acid), and 2,2'-bypyridine, respectively. The monomer and macroinitiator were synthesized in the lab, while other components are available commercially.

Figure 2:
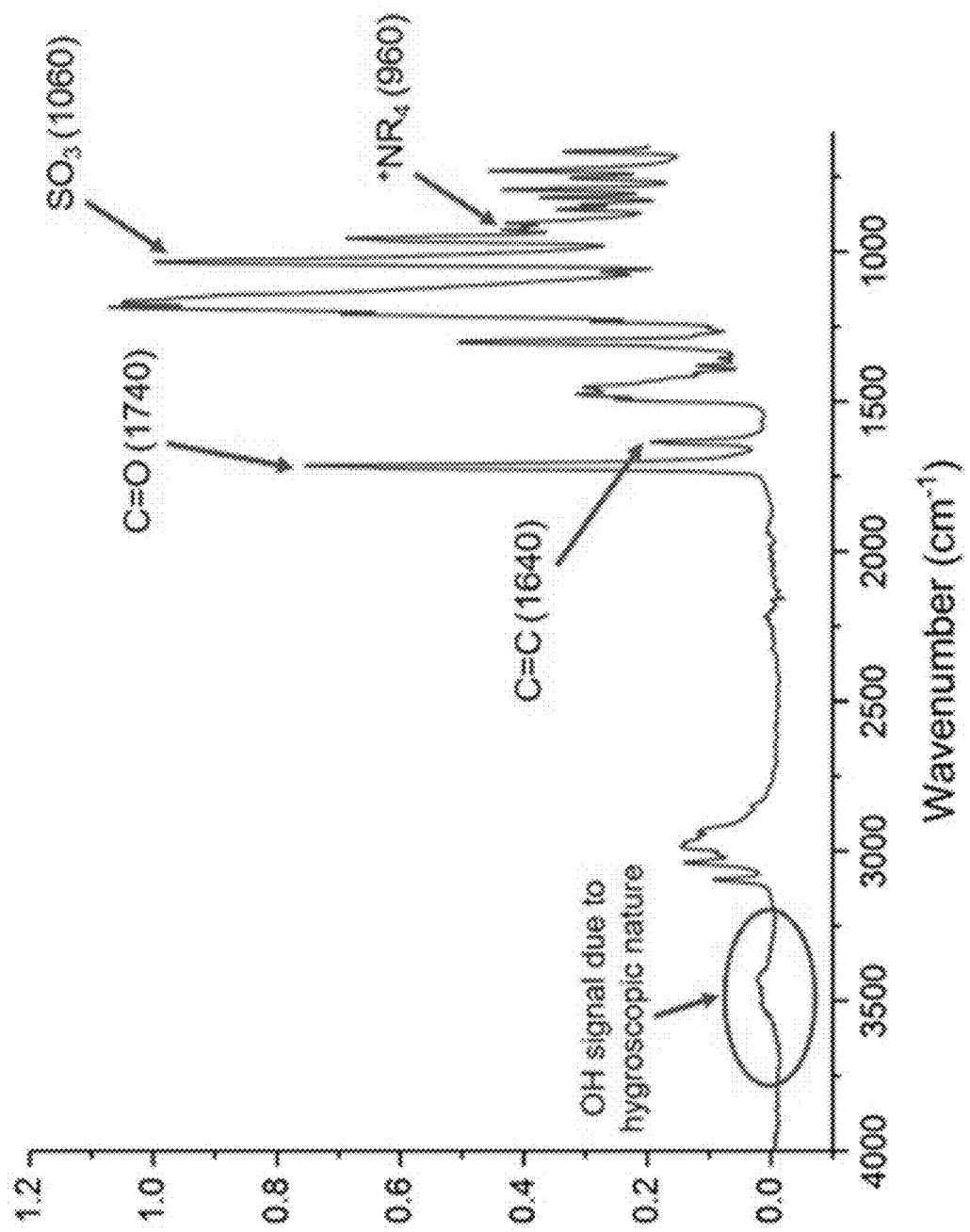
FIG. 2 shows the FTIR spectrum of the sulfobetaine methacrylate monomer.

Sulfobetaine methacrylate was prepared by reaction of 2-(dimethylamino) ethyl methacrylate with 1,3-propane sultone as illustrated in Scheme 1 above. The synthesized monomer was characterized by 1H-NMR, Fourier-transform infrared spectroscopy (FTIR) and melting point. The $^1$H-NMR data shows all the expected signals corresponding to the structure of the monomer, such as signals of the proton of the carbon-carbon double bond appear at 5.7 ppm and 6.15 ppm, and other characteristic peaks as illustrated in FIG. 1. FTIR spectrum showed signals for $^+NR_4$ (960 cm$^{-1}$), $SO_3$ (1060 cm$^{-1}$), C=C (1640 cm$^{-1}$), and C=O (1740 cm$^-$) as shown in FIG. 2. OH shift at 3500 cm' is observed due to hygroscopic nature of the monomer.[37] Also, melting point of the monomer was 150° C., which was within the reported products.[28]

Figure 3:
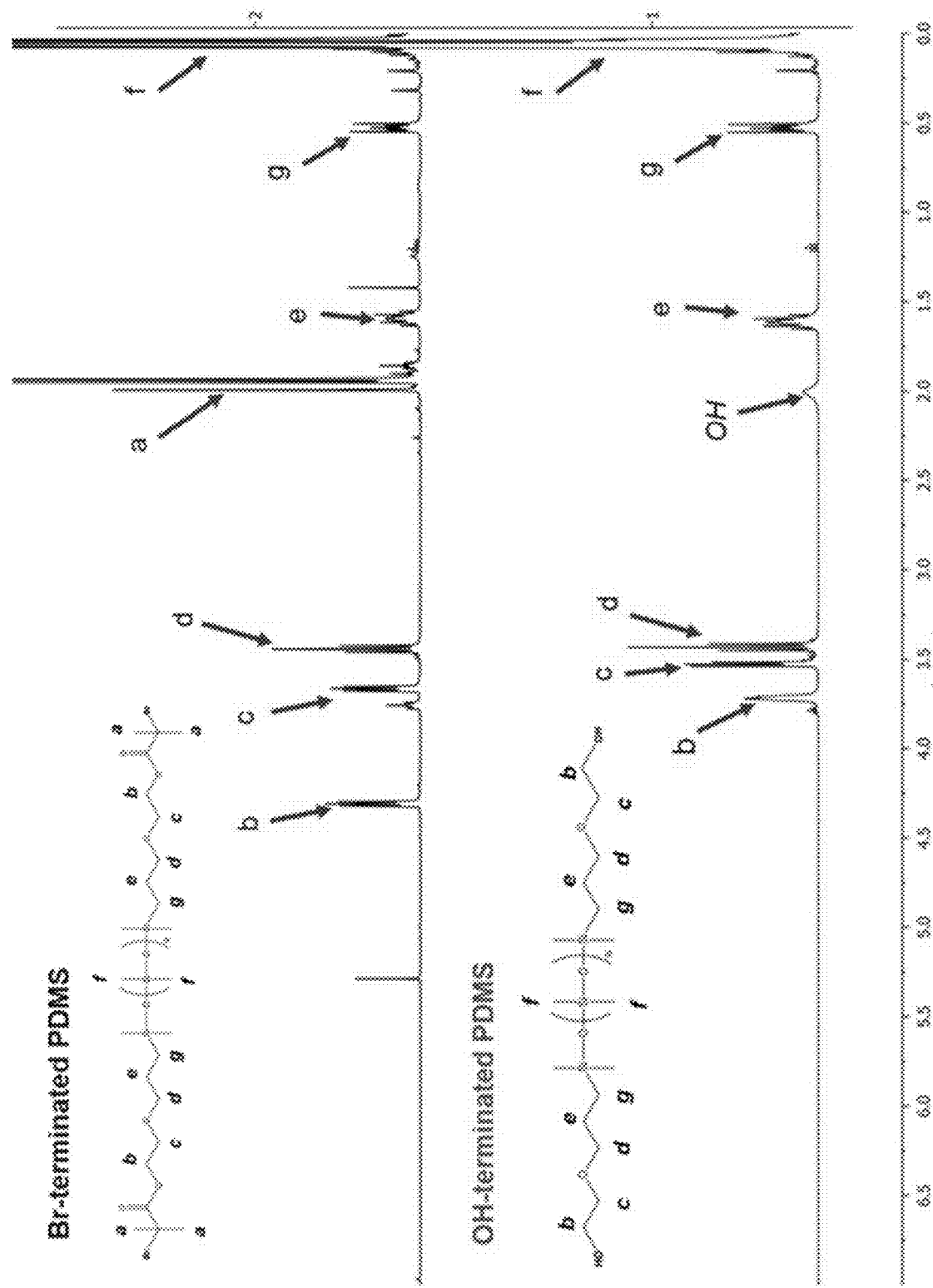
FIG. 3 shows the $^1$H-NMR spectrum of virgin and modified PDMS as macroinitiator.
Figure 4:
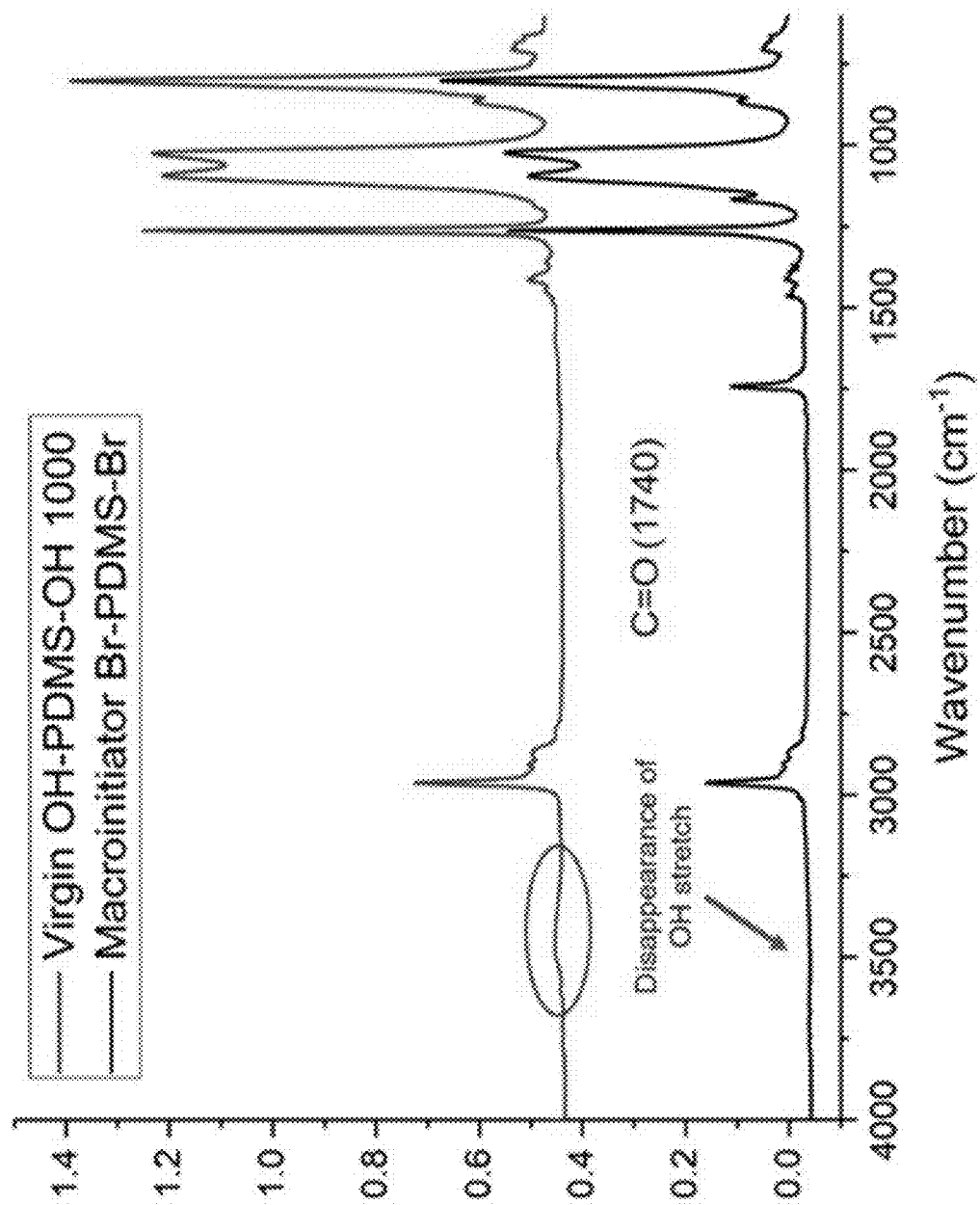
FIG. 4 shows the FTIR spectrum of virgin and modified PDMS as macroinitiator.

Br-terminated PDMS that functions as ARGET-ATRP macroinitiator to develop the additives was synthesized by substituting hydroxyl functional groups with BIBB as outlined in Scheme 2. A comparison of $^1$H-NMR between virgin PDMS and modified PDMS confirmed transformation of —OH end groups to bromine as OH signal disappeared at 4 ppm, signal "a" for two methyl groups of BIBB appeared at 1.9 ppm, and original signal "b" was further de-shielded due to electronegative nature of introduced bromine (FIG. 3). Furthermore, the transformation of end groups to bromine was supported by the appearance of C=O (1740 cm-1) and disappearance of OH (3500 cm⁻) signals in FTIR (FIG. 4).[26]

Figure 5:
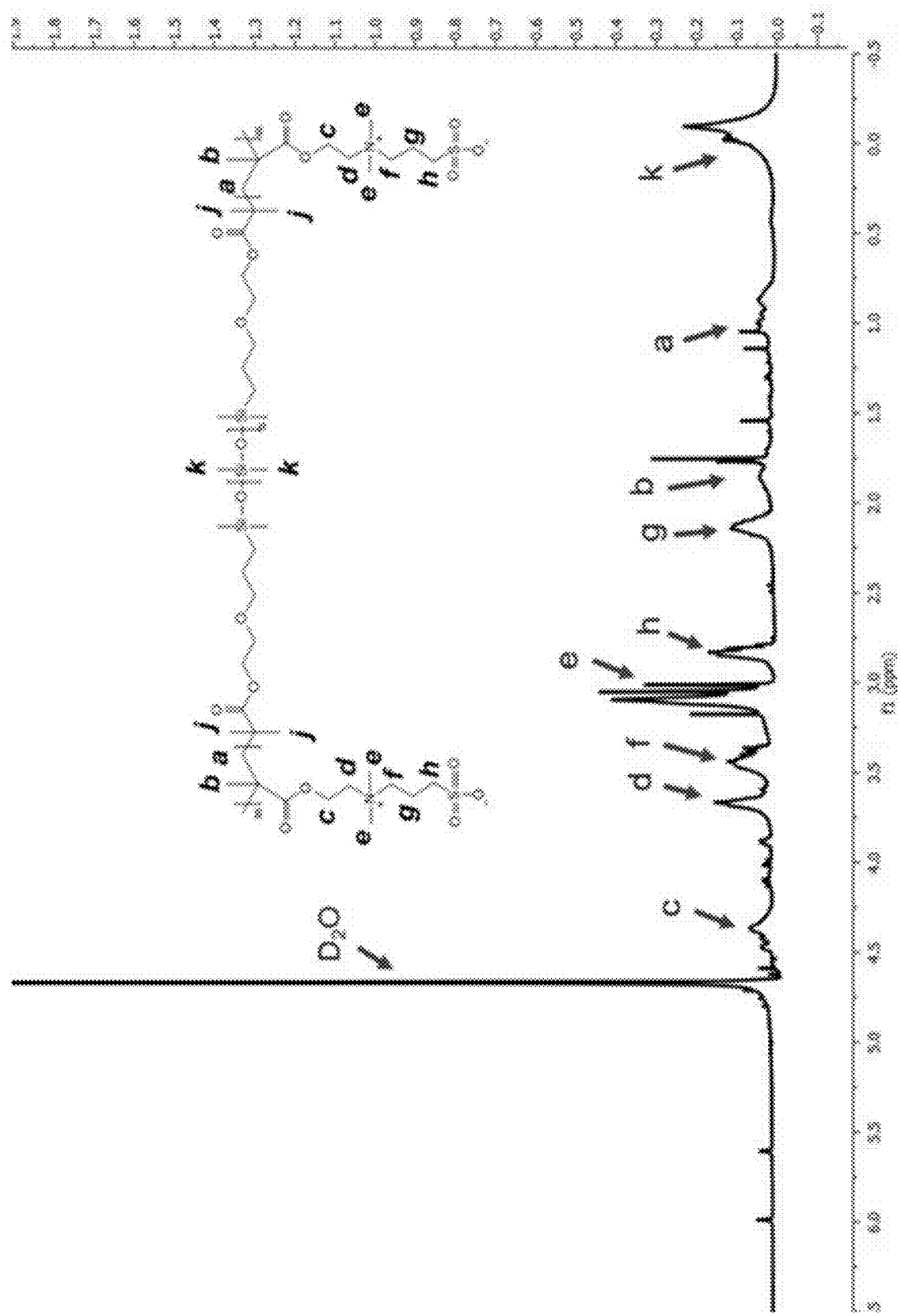
FIG. 5 shows the $^1$H-NMR spectrum of poly(SBMA)-PDMS-poly(SBMA) triblock in $D_2$.
Figure 6:
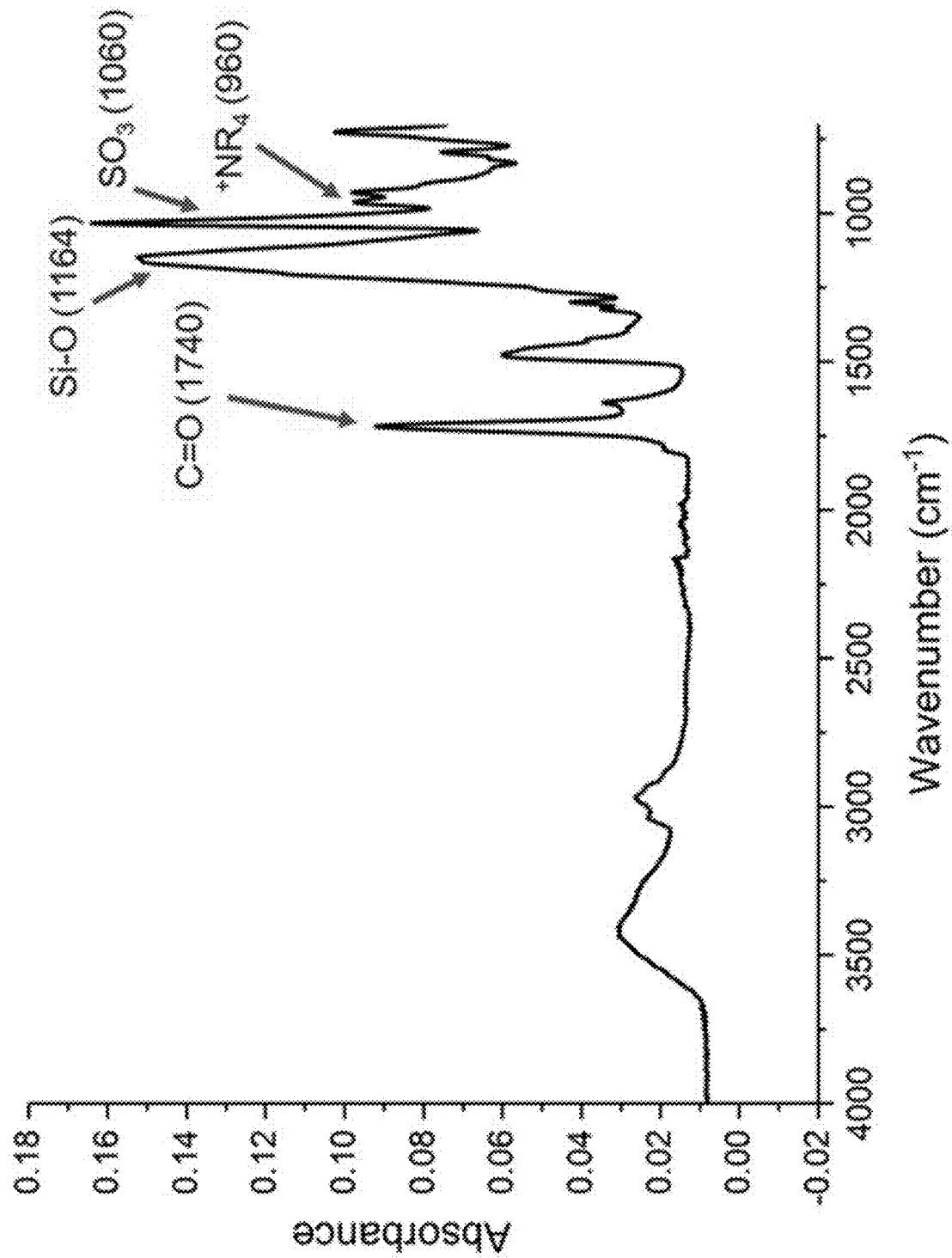
FIG. 6 shows the FTIR spectrum of poly(SBMA)-PDMS-poly(SBMA) triblock in $D_2O$.

After SBMA monomer and Br-terminated PDMS macroinitiator were synthesized, amphiphilic additives were synthesized as shown in Scheme 3 above. The characteristic $^1$H-NMR spectrum of tri-block ABA additive is shown in FIG. 5. The nearly disappeared peaks of the proton of the carbon-carbon double bond in SBMA (5.5-6.5 ppm) as well as broad peaks confirmed the polymerization of SBMA with the PDMS macroinitiator. The formation of additive is confirmed by FTIR data in FIG. 6 that has indicative signals for both poly(SBMA) and PDMS segments: C=O (1740 cm$^{-1}$), Si—O (1164 cm$^{-1}$), SO 3 (1060 cm$^{-1}$), and $^+$NR$_4$ (960 cm$^{-1}$).[21]

Figure 7:
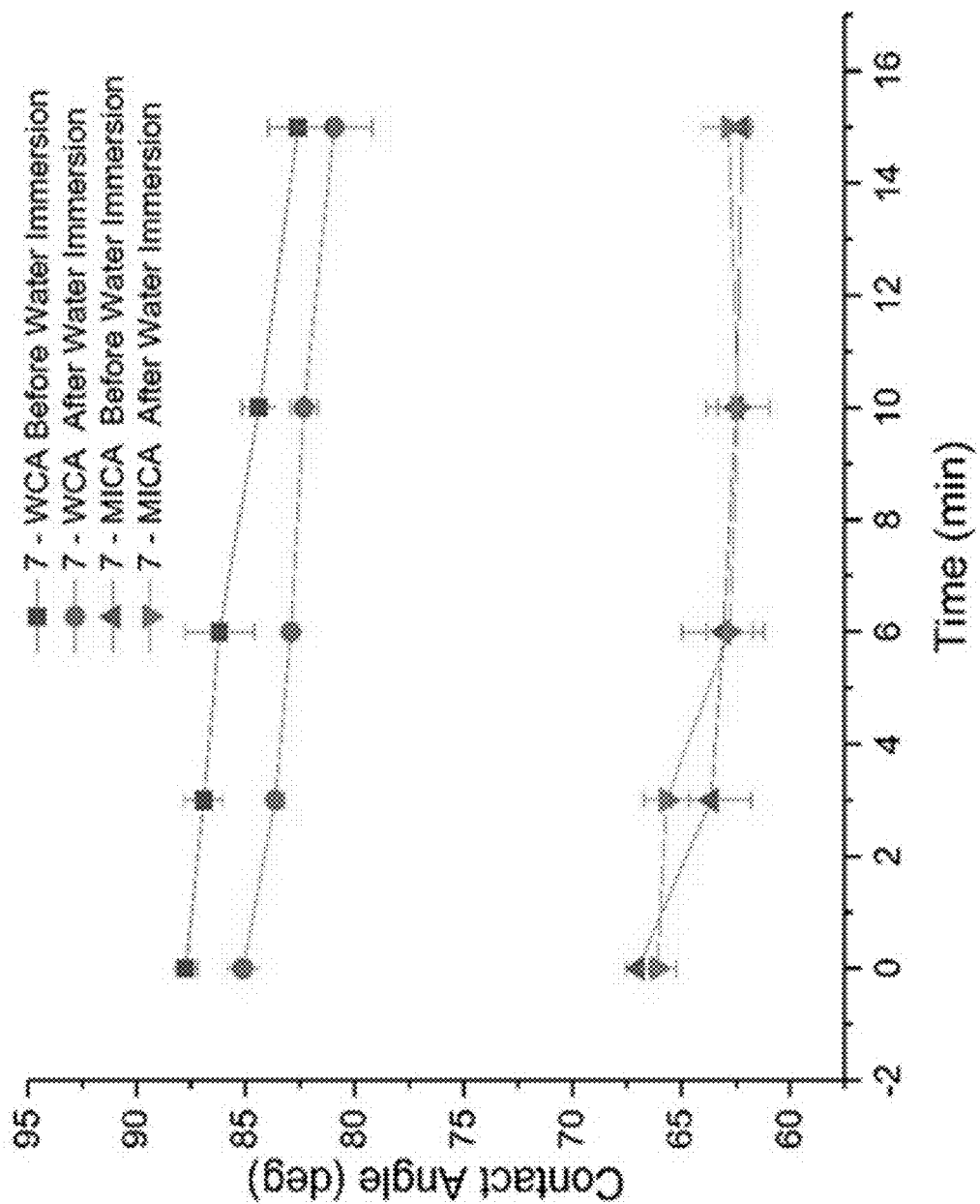
FIG. 7 shows the water and methylene iodide contact angles before and after 28 days of water ageing. Each data point represents the average and standard deviation of 3 measurements. Contact angle data for formulation 7 (ARR-2-94 1 k-1 k 5%).

The synthesized additives were incorporated in the SiPU A4-20 formulation in 0.2, 1, and 5 wt. %, and primed aluminum panels were coated. Two SMAAs were also added at 10 wt. %. Water contact angle (WCA) and methylene iodide contact angle (MICA) were measured for the formulations before and after a 28-day preleaching in tanks of artificial seawater. The measurements were taken several times in a 15-minutes interval. The overall trend for all formulations appeared as FIG. 7, a depiction of data for Formulation 7 (ARR-2-94 1 k-1 k 5%).

Figure 8:
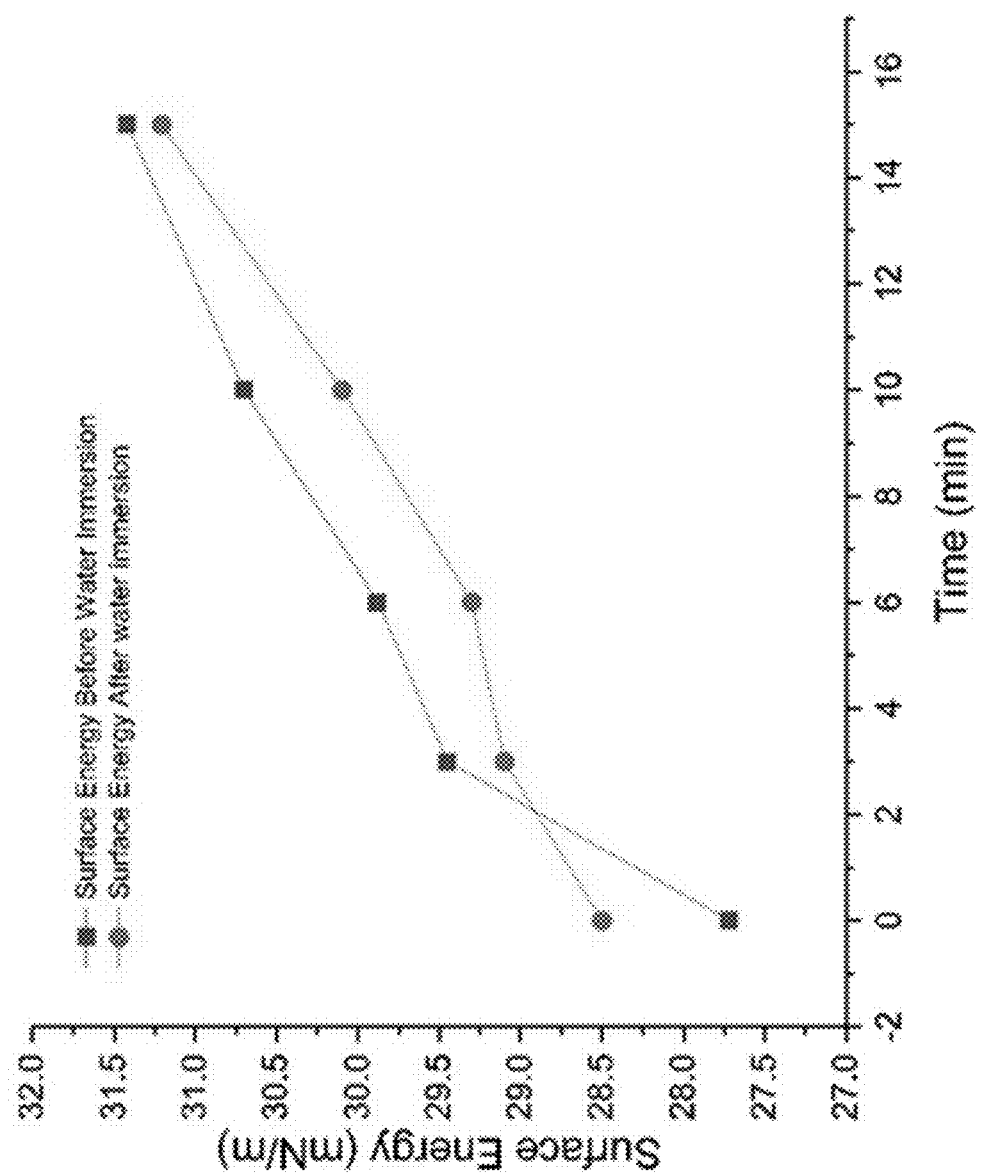
FIG. 8 shows the surface energy data for formulation 7 (ARR-2-94 1 k-1 k 5%), calculated using Owen-Wendt method utilizing the average WCA and MICA measurements.

Surface energy for each formulation was calculated using Owen-Wendt method utilizing the average WCA and MICA measurements for each measured point. The overall trend for all formulations appeared as FIG. 8, a depiction of data for Formulation 7 (ARR-2-94 1 k-1 k 5%).

A summary of WCA, MICA, and surface energy data for each formulation is outlined in Table 5.

TABLE 5

WCA, MICA, and surface energy data for formulated coatings.

| Formulation ID | WCA Before Water Immersion (deg) | | WCA After Water Immersion (deg) | | MICA Before Water Immersion (deg) | | MICA After Water Immersion (deg) | | Surface Energy Before Water immersion (mN/m) | | Surface Energy After Water immersion (mN/m) | |
|---|---|---|---|---|---|---|---|---|---|---|---|---|
| | 0 min | 15 mins | 0 min | 15 mins | 0 min | 15 mins | 0 min | 15 mins | 0 min | 15 mins | 0 min | 15 mins |
| 1 | 98.4 | 95.8 | 101.0 | 95.8 | 67.5 | 68.2 | 68.4 | 67.7 | 25.1 | 25.0 | 24.3 | 25.4 |
| 2 | 96.4 | 87.9 | 96.2 | 87.4 | 69.0 | 69.3 | 68.3 | 69.5 | 24.7 | 26.7 | 25.3 | 26.7 |
| 3 | 94.1 | 90.0 | 94.5 | 87.6 | 70.0 | 67.0 | 70.0 | 68.0 | 22.8 | 27.1 | 24.7 | 27.1 |
| 4 | 85.9 | 85.1 | 89.5 | 88.3 | 67.8 | 64.7 | 67.1 | 65.0 | 28.0 | 29.8 | 27.2 | 28.4 |
| 5 | 92.3 | 88.7 | 94.3 | 89.1 | 68.8 | 64.4 | 68.8 | 64.4 | 25.7 | 28.6 | 25.2 | 28.5 |
| 6 | 95.3 | 89.2 | 95.8 | 88.8 | 68.1 | 61.7 | 68.4 | 62.0 | 25.3 | 27.6 | 25.7 | 30.5 |
| 7 | 87.7 | 82.6 | 85.1 | 80.9 | 67.1 | 62.2 | 66.3 | 63.1 | 27.7 | 31.4 | 28.9 | 31.5 |
| 8 | 96.9 | 91.9 | 96.3 | 90.2 | 67.9 | 65.6 | 67.9 | 65.6 | 25.1 | 25.4 | 25.3 | 27.3 |
| 9 | 96.2 | 90.8 | 95.4 | 89.7 | 67.3 | 69.3 | 67.1 | 69.0 | 25.6 | 25.9 | 25.7 | 26.1 |
| 10 | 89.6 | 85.8 | 90.5 | 87.7 | 68.7 | 68.4 | 67.7 | 68.4 | 26.4 | 27.5 | 26.7 | 26.7 |
| 11 | 95.3 | 89.5 | 96.1 | 89.2 | 63.7 | 60.2 | 63.4 | 60.3 | 27.5 | 30.4 | 27.4 | 30.4 |
| 12 | 95.0 | 90.1 | 96.0 | 89.9 | 64.1 | 61.9 | 64.1 | 61.9 | 26.2 | 29.4 | 27.2 | 29.5 |
| 13 | 89.5 | 84.4 | 91.3 | 88.5 | 69.7 | 64.7 | 69.3 | 65.1 | 26.0 | 29.8 | 25.7 | 28.3 |
| 14 | 93.8 | 89.5 | 94.4 | 90.2 | 63.7 | 60.2 | 62.9 | 60.1 | 27.8 | 30.4 | 28.0 | 30.5 |
| 15 | 94.9 | 86.3 | 96.4 | 87.8 | 63.7 | 60.2 | 64.8 | 60.7 | 27.5 | 31.2 | 27.3 | 30.8 |
| 16 | 84.8 | 73.3 | 84.5 | 77.8 | 59.0 | 58.3 | 59.6 | 59.2 | 32.1 | 36.6 | 32.0 | 34.4 |
| 17 | 93.3 | 87.8 | 91.1 | 88.9 | 65.3 | 67.2 | 65.3 | 67.1 | 27.7 | 28.4 | 27.6 | 27.3 |
| 18 | 92.3 | 86.3 | 95.5 | 90.1 | 65.3 | 67.2 | 65.3 | 67.1 | 27.3 | 28.1 | 26.5 | 27.0 |
| 19 | 90.7 | 85.3 | 95.4 | 89.8 | 65.3 | 67.2 | 66.5 | 67.1 | 27.7 | 28.4 | 26.1 | 26.8 |
| 20 | 95.0 | 89.2 | 96.8 | 89.7 | 66.6 | 67.0 | 66.1 | 66.3 | 26.1 | 27.3 | 25.8 | 27.2 |
| 21 | 92.3 | 89.0 | 94.8 | 90.1 | 66.2 | 67.1 | 67.3 | 67.4 | 26.7 | 27.3 | 26.2 | 27.1 |
| 22 | 93.8 | 89.5 | 95.2 | 89.8 | 69.1 | 67.5 | 69.3 | 66.4 | 24.8 | 27.4 | 24.9 | 26.9 |
| 23 | 92.5 | 89.3 | 94.0 | 91.2 | 69.1 | 67.5 | 68.7 | 68.2 | 25.5 | 27.1 | 25.1 | 26.8 |
| 24 | 95.7 | 88.1 | 89.2 | 85.5 | 69.1 | 67.5 | 68.7 | 67.4 | 24.8 | 27.4 | 26.4 | 28.4 |
| 25 | 105.0 | 91.5 | 95.4 | 91.2 | 66.4 | 66.0 | 67.1 | 65.8 | 25.0 | 26.7 | 25.6 | 27.0 |
| 26 | 104.4 | 90.5 | 97.4 | 90.6 | 66.4 | 66.0 | 65.3 | 65.8 | 25.0 | 27.5 | 25.4 | 27.3 |
| 27 | 104.0 | 90.1 | 94.5 | 90.0 | 66.4 | 66.0 | 65.3 | 67.1 | 25.0 | 27.5 | 26.8 | 26.7 |
| 28 | 93.0 | 87.0 | 95.2 | 89.1 | 68.6 | 68.3 | 67.5 | 70.3 | 25.5 | 27.5 | 25.6 | 27.2 |
| 29 | 90.0 | 84.0 | 92.4 | 88.4 | 68.6 | 68.4 | 67.5 | 70.3 | 26.3 | 28.4 | 25.7 | 27.0 |
| 30 | 90.0 | 84.0 | 88.0 | 83.0 | 68.1 | 68.3 | 69.3 | 67.1 | 26.3 | 28.4 | 26.6 | 29.1 |
| 31 | 93.0 | 88.0 | 91.0 | 88.0 | 63.9 | 63.0 | 64.2 | 64.3 | 27.9 | 29.5 | 28.4 | 30.0 |
| 32 | 91.0 | 84.3 | 93.0 | 85.7 | 64.1 | 63.0 | 63.7 | 64.1 | 28.2 | 30.5 | 28.6 | 30.6 |
| 33 | 86.3 | 76.5 | 88.5 | 84.6 | 64.0 | 63.3 | 65.3 | 60.0 | 29.5 | 28.4 | 33.4 | 31.7 |
| 34 | 93.6 | 87.2 | 94.5 | 88.3 | 65.9 | 60.5 | 67.4 | 60.7 | 26.7 | 30.8 | 29.0 | 33.4 |
| 35 | 92.3 | 82.4 | 93.9 | 84.8 | 63.9 | 60.9 | 64.1 | 61.2 | 27.0 | 32.3 | 27.3 | 31.5 |
| 36 | 89.9 | 82.1 | 97.7 | 79.3 | 64.3 | 60.5 | 66.6 | 61.6 | 27.6 | 32.3 | 25.6 | 33.0 |
| 37 | 89.9 | 83.9 | 89.1 | 86.4 | 68.6 | 66.3 | 65.3 | 67.1 | 26.4 | 29.2 | 28.1 | 28.1 |
| 38 | 82.1 | 74.2 | 84.4 | 80.1 | 64.2 | 64.7 | 63.0 | 62.7 | 30.8 | 33.8 | 30.5 | 32.1 |
| 39 | 94.2 | 86.4 | 90.6 | 87.7 | 67.9 | 62.5 | 67.6 | 67.1 | 25.7 | 30.0 | 26.6 | 27.7 |
| 40 | 93.5 | 88.7 | 86.6 | 84.2 | 69.4 | 68.3 | 69.5 | 67.9 | 25.1 | 26.9 | 27.0 | 28.5 |
| 41 | 95.0 | 88.0 | 92.0 | 90.0 | 68.9 | 66.7 | 69.3 | 67.1 | 25.1 | 27.8 | 25.4 | 27.1 |

TABLE 5-continued

WCA, MICA, and surface energy data for formulated coatings.

| Formulation ID | WCA Before Water Immersion (deg) | | WCA After Water Immersion (deg) | | MICA Before Water Immersion (deg) | | MICA After Water Immersion (deg) | | Surface Energy Before Water immersion (mN/m) | | Surface Energy After Water immersion (mN/m) | |
|---|---|---|---|---|---|---|---|---|---|---|---|---|
| | 0 min | 15 mins | 0 min | 15 mins | 0 min | 15 mins | 0 min | 15 mins | 0 min | 15 mins | 0 min | 15 mins |
| 42 | 91.0 | 88.2 | 85.8 | 81.3 | 67.6 | 66.2 | 65.3 | 67.1 | 26.5 | 27.9 | 29.0 | 29.9 |
| 43 | 92.7 | 86.5 | 86.7 | 83.7 | 67.1 | 65.8 | 66.8 | 66.3 | 26.4 | 28.6 | 28.1 | 29.3 |

Figure 9:
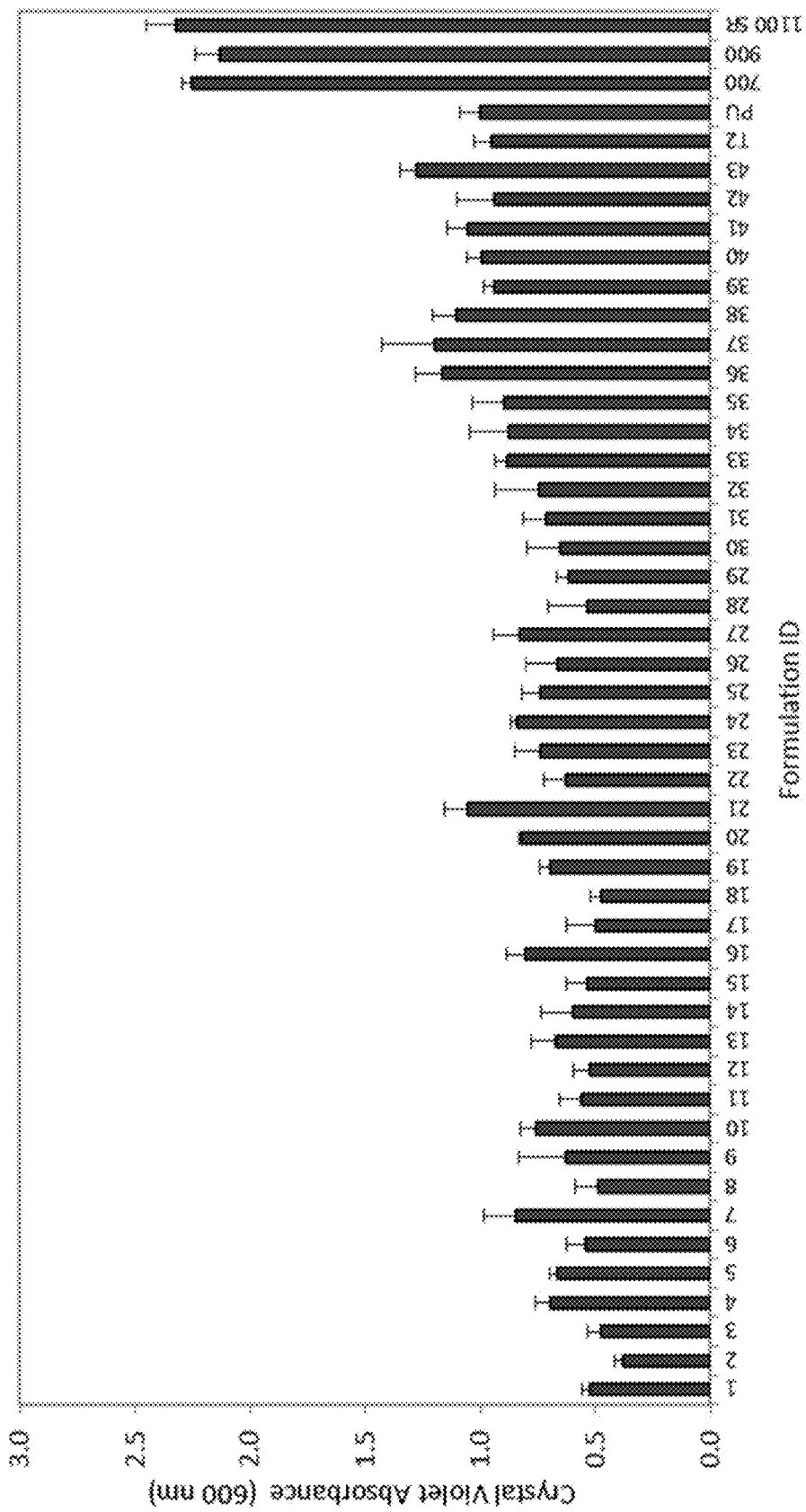
FIG. 9 shows the bacterial biofilm (C. lytica) growth in 24 hours.
Figure 10:
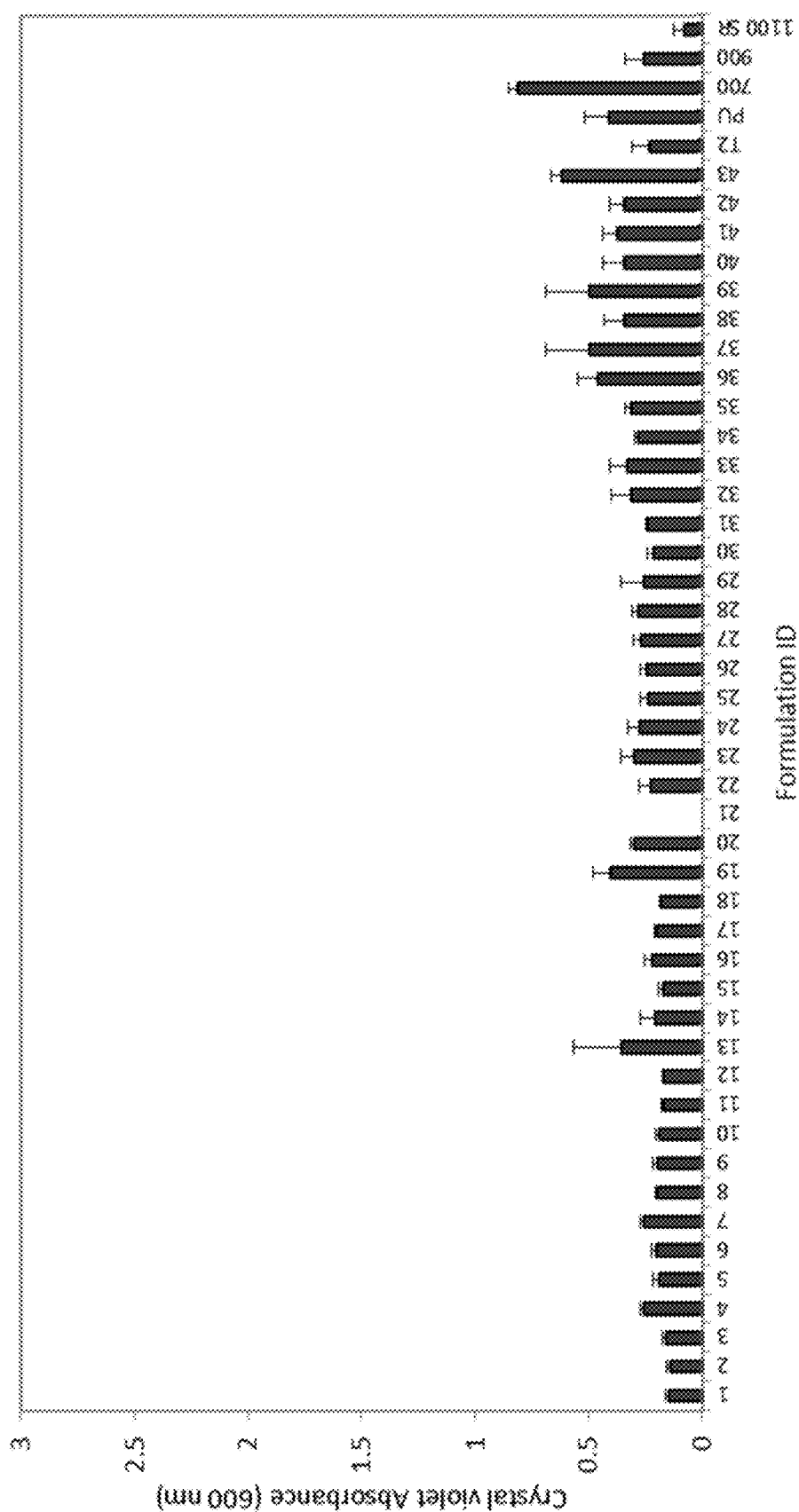
FIG. 10 shows the bacterial biofilm (C. lytica) adhesion; biomass remaining at 20 psi water pressure treatment.

Evaluation data for the coatings with marine bacterium, *C. lytica*, is illustrated in the following two figures. FIG. 9 shows the growth of biofilm on the surface of each coating, and FIG. 10 shows the biomass remaining after water-jet treatment at 20 psi pressure. Each bar represents the average of 3 replicate measurements and the error bars represent the standard deviation of the mean.

Figure 11:
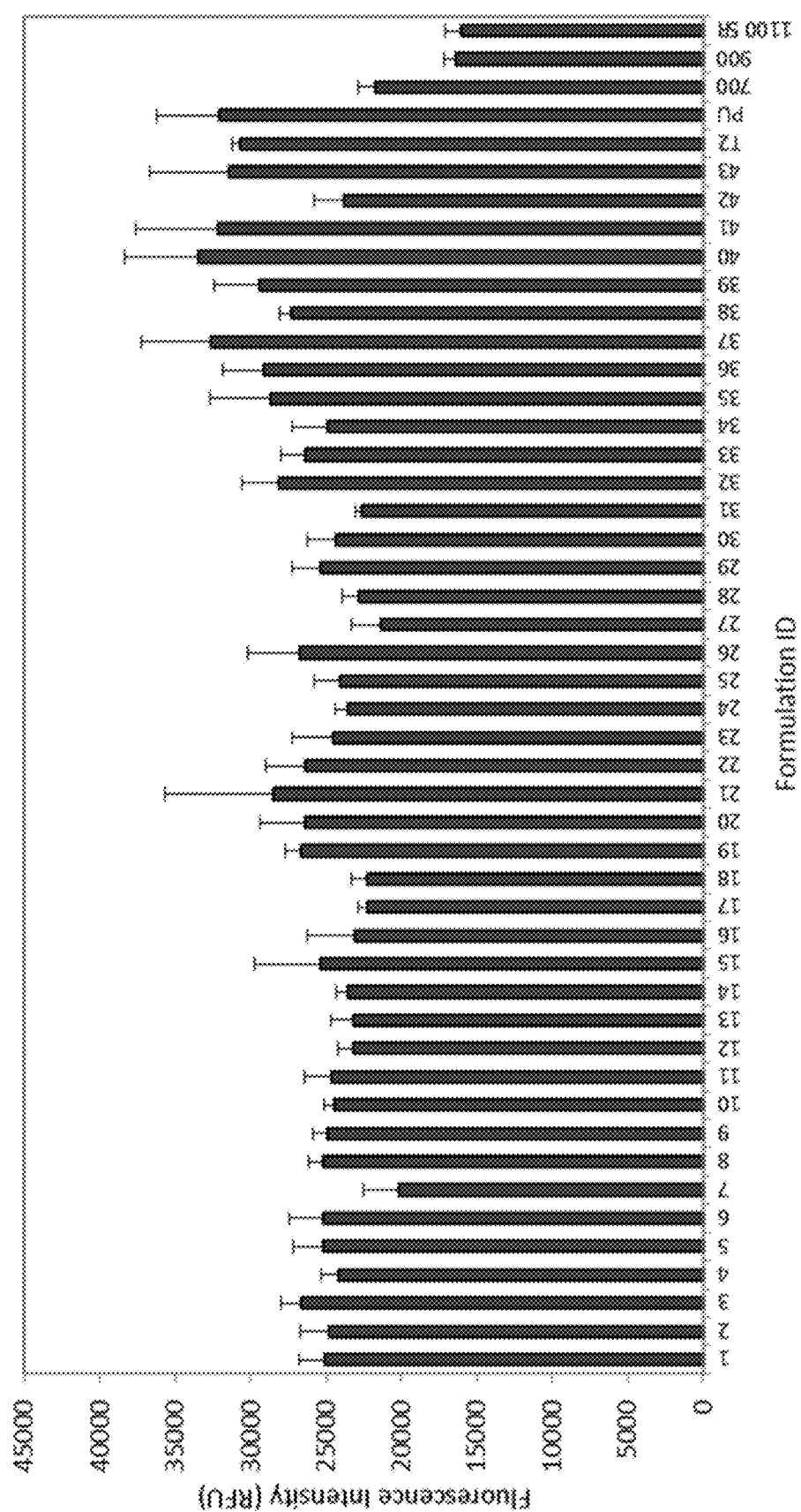
FIG. 11 shows the fouling microalgae (N. Incerta) cell attachment.
Figure 12:
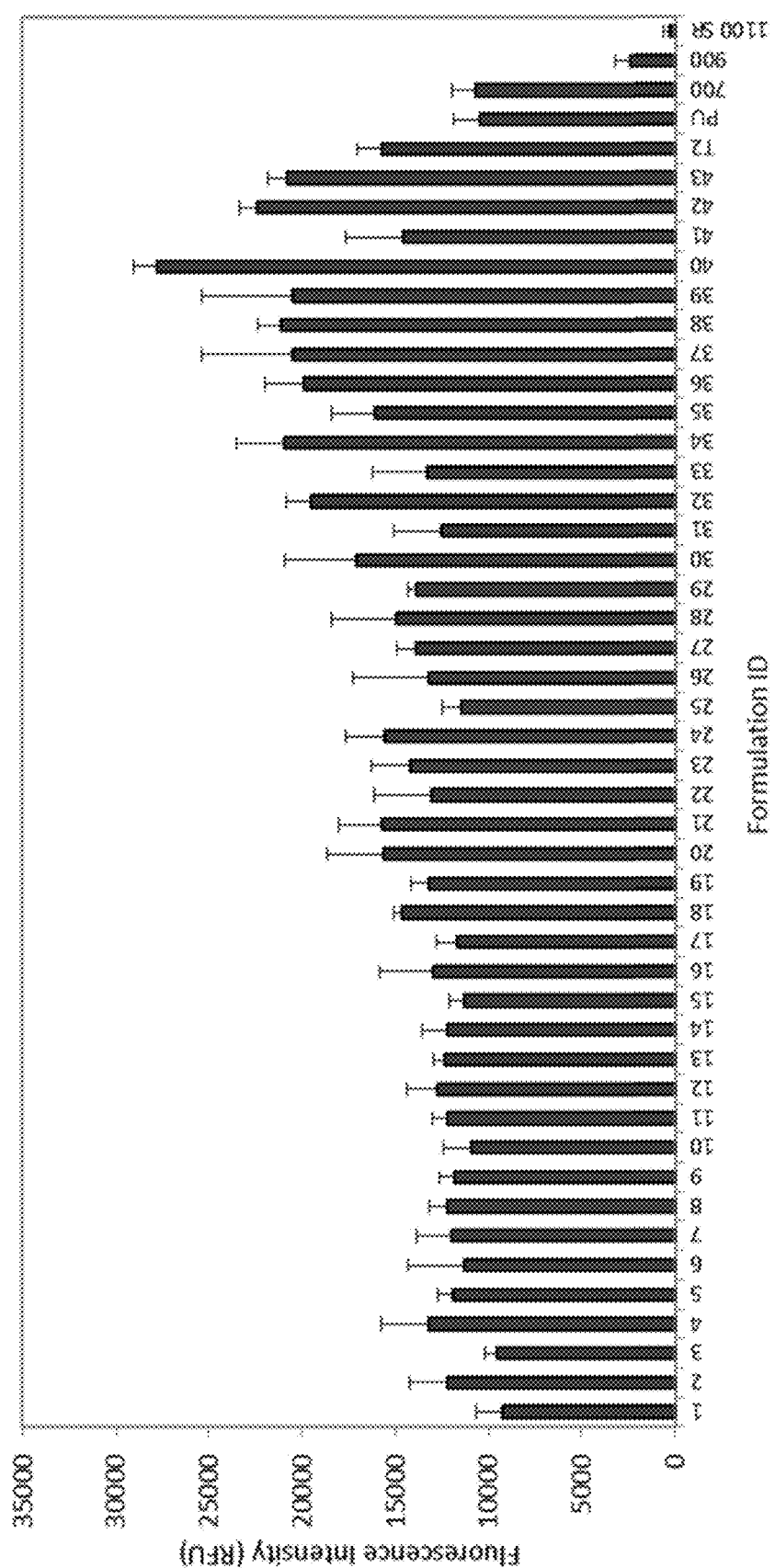
FIG. 12 shows the biomass (N. Incerta) remaining after water-jet treatment at 20 psi pressure. Each bar represents the average of 3 replicate measurements and the error bars represent the standard deviation of the mean.

Evaluation data for the coatings with marine fouling microalgae, *N. Incerta*, is illustrated in the following two figures. FIG. 11 shows the growth of biofilm on the surface of each coating, and FIG. 12 shows the biomass remaining after water-jet treatment at 20 psi pressure. Each bar represents the average of 3 replicate measurements and the error bars represent the standard deviation of the mean.

Figure 13:
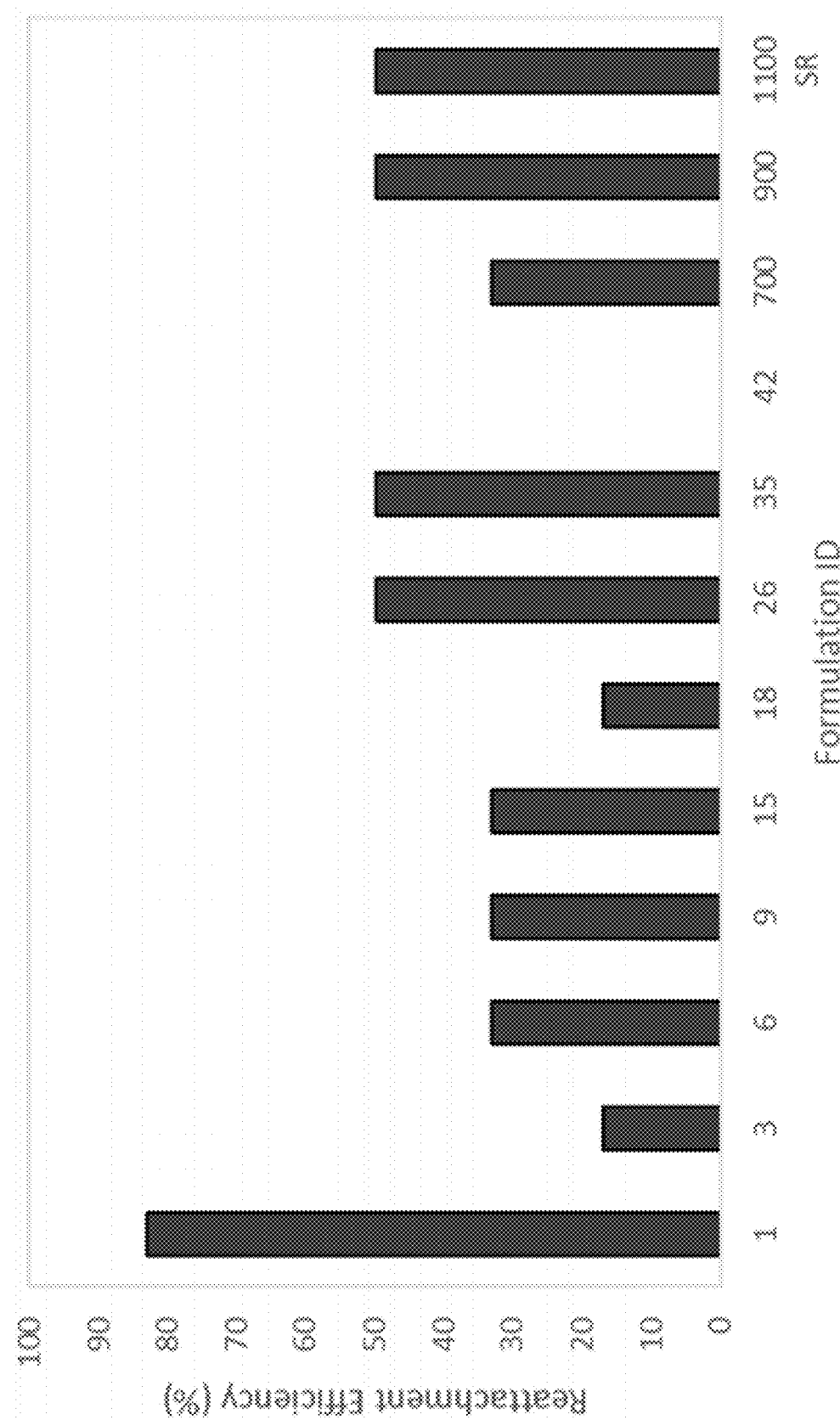
FIG. 13 shows the assessment of reattached barnacles to surface of coatings. No barnacles were reattached to coating 42.
Figure 14:
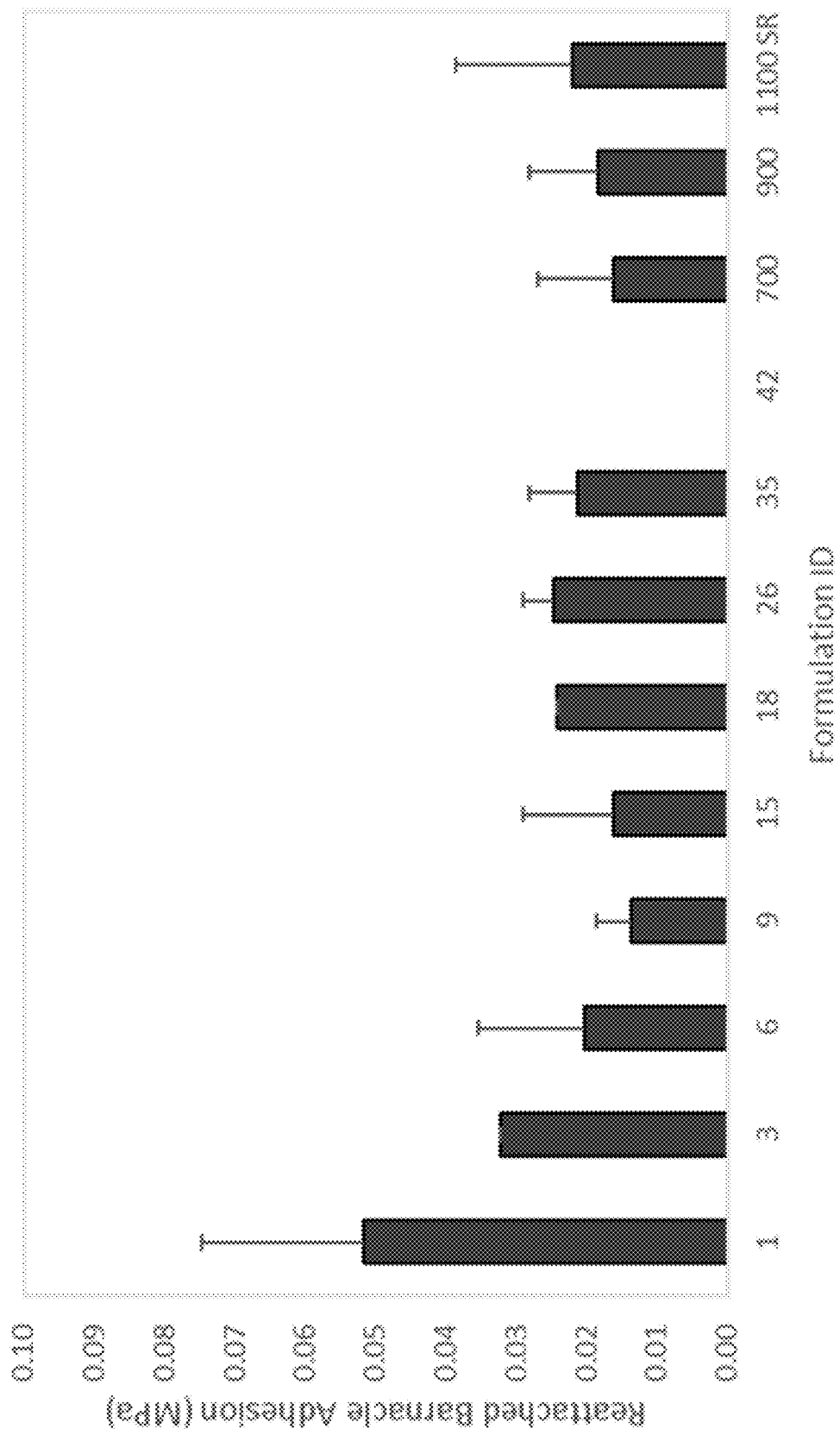
FIG. 14 shows the reattached barnacle (A. Amphitrite) adhesion strength. No broken/damaged barnacles were reported during push off measurements. Each bar represents the average adhesion strength based on the number of successfully pushed barnacles and the error bars represent the standard deviation of the mean. No barnacles were reattached to coating 42.

After the biological assessments for *C. lytica* and *N. incerta* were performed, nine formulations were selected to be tested with marine fouling barnacle *A. Amphitrite*. FIG. 13 shows the percentage of 6 barnacles that reattached to the surface of each assessed coating (i.e., 50% means 3 barnacles out of 6 attached to coating 26 or 35). FIG. 14 shows the barnacle adhesion strength to be detached from the coating.

REFERENCES

1. Callow, J. A. & Callow, M. E. Trends in the development of environmentally friendly fouling-resistant marine coatings. *Nat. Commun.* 2, 244 (2011).
2. Callow, M. E. & Callow, J. E. Marine biofouling: a sticky problem. *Biologist* 49, 10-14 (2002).
3. Lejars, M., Margaillan, A. & Bressy, C. Fouling Release Coatings: A Nontoxic Alternative to Biocidal Antifouling Coatings. *Chem. Rev.* 112, 4347-4390 (2012).
4. Magin, C. M., Cooper, S. P. & Brennan, A. B. Non-toxic antifouling strategies. *Mater. Today* 13, 36-44 (2010).
5. Konstantinou, I. K. & Albanis, T. A. Worldwide occurrence and effects of antifouling paint booster biocides in the aquatic environment: a review. *Environ. Int.* 30, 235-248 (2004).
6. Wyszogrodzka, M. & Haag, R. Synthesis and Characterization of Glycerol Dendrons, Self-Assembled Monolayers on Gold: A Detailed Study of Their Protein Resistance. *Biomacromolecules* 10, 1043-1054 (2009).
7. Yebra, D. M., Kiil, S. & Dam-Johansen, K. Antifouling technology—past, present and future steps towards efficient and environmentally friendly antifouling coatings. *Prog. Org. Coatings* 50, 75-104 (2004).
8. Sommer, S. et al. A preliminary study on the properties and fouling-release performance of siloxane-polyurethane coatings prepared from poly(dimethylsiloxane) (PDMS) macromere. *Biofouling* 26, 961-972 (2010).
9. Bodkhe, R. B. et al. The effect of formulation variables on fouling-release performance of stratified siloxane-polyurethane coatings. doi:10.1007/s11998-011-9362-x
10. Iguerb, O., Poleunis, C., Mazéas, F., Compère, C. & Bertrand, P. Antifouling Properties of Poly(methyl methacrylate) Films Grafted with Poly(ethylene glycol) Monoacrylate Immersed in Seawater. *Langmuir* 24, 12272-12281 (2008).
11. Heuberger, M., Drobek, T. & Spencer, N. D. Interaction Forces and Morphology of a Protein-Resistant Poly(ethylene glycol) Layer. *Biophys. J.* 88, 495-504 (2005).
12. Jeon, S. I., Lee, J. H., Andrade, J. D. & De Gennes, P. G. Protein—surface interactions in the presence of polyethylene oxide: I. Simplified theory. *J. Colloid Interface Sci.* 142, 149-158 (1991).
13. Szleifer, I. Polymers and proteins: interactions at interfaces. *Curr. Opin. Solid State Mater. Sci.* 2, 337-344 (1997).
14. Prime, K. L. & Whitesides, G. M. Adsorption of Proteins onto Surfaces Containing End-Attached OHgo(ethylene oxide): A Model System Using Self-Assembled Monolayers. *J. Am. Chem. Soc* 115, (1993).
15. Galhenage, T. P. et al. Poly(ethylene) glycol-modified, amphiphilic, siloxane—polyurethane coatings and their performance as fouling-release surfaces. *J. Coatings Technol. Res.* 14, 307-322 (2017).
16. Zheng Zhang, Shengfu Chen, Yung Chang, A. & Jiang*, S. Surface Grafted Sulfobetaine Polymers via Atom Transfer Radical Polymerization as Superlow Fouling Coatings. *J. Phys. Chem. B* 110, 10799-10804 (2006).
17. Jiang, S. & Cao, Z. Ultralow-Fouling, Functionalizable, and Hydrolyzable Zwitterionic Materials and Their Derivatives for Biological Applications. *Adv. Mater.* 22, 920-932 (2010).
18. Wu, C.-J., Huang, C.-J., Jiang, S., Sheng, Y.-J. & Tsao, H.-K. Superhydrophilicity and spontaneous spreading on zwitterionic surfaces: carboxybetaine and sulfobetaine. *RSC Adv.* 6, 24827-24834 (2016).
19. Zhang, Z. et al. Polysulfobetaine-Grafted Surfaces as Environmentally Benign Ultralow Fouling Marine Coatings. *Langmuir* 25, 13516-13521 (2009).
20. Liu, P. et al. Zwitterionic modification of polyurethane membranes for enhancing the anti-fouling property. *J. Colloid Interface Sci.* 480, 91-101 (2016).
21. Bodkhe, R. B. et al. Zwitterionic siloxane-polyurethane fouling-release coatings. *Prog. Org. Coatings* 78, 369-380 (2015).
22. Wu, J., Lin, W., Wang, Z., Chen, S. & Chang, Y. Investigation of the Hydration of Nonfouling Material Poly(sulfobetaine methacrylate) by Low-Field Nuclear Magnetic Resonance. *Langmuir* 28, 7436-7441 (2012).

23. Bodkhe, R. B. et al. The effect of formulation variables on fouling-release performance of stratified siloxane-polyurethane coatings. *J. Coatings Technol. Res.* 9, 235-249 (2012).
24. Wu, J. & Chen, S. Investigation of the Hydration of Nonfouling Material Poly(ethylene glycol) by Low-Field Nuclear Magnetic Resonance. Langmuir 28, 2137-2144 (2012).
25. Zheng Zhang, Shengfu Chen, Yung Chang, and & Jiang*, S. Surface Grafted Sulfobetaine Polymers via Atom Transfer Radical Polymerization as Superlow Fouling Coatings. *J. Phys. Chem. B* 110, 10799-10804 (2006).
26. Bodkhe, R. B. & Webster, D. C. Synthesis and characterization of novel polysiloxane based ABA-type triblock copolymers using ATRP. *e-Polymers* 13, (2013).
27. Wojciech Jakubowski, Ke Min, A. & Matyjaszewski*, K. Activators Regenerated by Electron Transfer for Atom Transfer Radical Polymerization of Styrene. *Macromolecules* 39, 39-45 (2006).
28. Liaw, D.-J. & Lee, W.-F. Thermal degradation of poly [3-dimethyl(methylmethacryloylethyl) ammonium propanesulfonate]. *J. Appl. Polym. Sci.* 30, 4697-4706 (1985).
29. Min, K., Gao, H. & Matyjaszewski, K. Use of Ascorbic Acid as Reducing Agent for Synthesis of Well-Defined Polymers by ARGET ATRP Scheme 1. Proposed Mechanism for ARGET ATRP. *Macromolecules* 40, 1789-1791 (2007).
30. Stafslien, S. J. et al. Combinatorial materials research applied to the development of new surface coatings VI: An automated spinning water jet apparatus for the high-throughput characterization of fouling-release marine coatings. *Rev. Sci. Instrum.* 78, 072204 (2007).
31. Callow, M., Callow, J., Conlan, S. & Clare, A. S. Efficacy testing of nonbiocidal and fouling-release coatings. in *Biofouling Methods* 291-316 (John Wiley & Sons, Ltd, 2014).
32. Stafslien, S. et al. Combinatorial materials research applied to the development of new surface coatings IV. A high-throughput bacterial biofilm retention and retraction assay for screening fouling-release performance of coatings. *Biofouling* 23, 45-54 (2007).
33. Cassé, F. et al. Laboratory screening of coating libraries for algal adhesion. *Biofouling* 23, 267-276 (2007).
34. Cassé, F. et al. Combinatorial materials research applied to the development of new surface coatings V. Application of a spinning water-jet for the semi-high throughput assessment of the attachment strength of marine fouling algae. Biofouling 23, 121-130 (2007).
35. Stafslien, S. et al. An improved laboratory reattachment method for the rapid assessment of adult barnacle adhesion strength to fouling-release marine coatings. *J. Coatings Technol. Res.* 9, 651-665 (2012).
36. Rittschof, D. et al. Barnacle reattachment: a tool for studying barnacle adhesion. *Biofouling* 24, 1-9 (2008).
37. Kitano, H. et al. Structure of Water Incorporated in Sulfobetaine Polymer Films as Studied by ATR-FTIR. *Macromol. Biosci.* 5, 314-321 (2005).

The claimed invention is:

1. A curable coating composition, comprising:
    a) at least one surface-modifying amphiphilic additive (SMAA), wherein the SMAA is a block copolymer of a mono- or a di-functional carbinol terminated poly (dimethylsiloxane) (PDMS) and a zwitterionic polymer;
    b) at least one polyisocyanate;
    c) at least one polyol; and
    d) at least one amine-terminated polydimethyl siloxane (A-PDMS).

2. The curable coating composition of claim 1, wherein the SMAA is present in the curable coating composition in an amount ranging from 0.1 to 20 wt %, based on the amount of non-volatile components in the curable coating composition.

3. The curable coating composition of claim 1, wherein the block copolymer is a diblock copolymer, a triblock copolymer, or mixtures thereof.

4. The curable coating composition of claim 1, wherein the zwitterionic polymer comprises sulfobetaine, carboxybetaine, phosphobetaine, or mixtures thereof.

5. The curable coating composition of claim 1, wherein the zwitterionic polymer is prepared from zwitterionic monomers selected from the group consisting of sulfobetaine methacrylate, sulfobetaine acrylate, carboxybetaine methacrylate, carboxybetaine acrylate, and mixtures thereof.

6. The curable coating composition of claim 1, wherein the zwitterionic polymer is poly(sulfobetaine methacrylate) (poly(SBMA)).

7. The curable coating composition of claim 6, wherein the poly(SBMA) has a molecular weight ranging from 250 to 10,000 g/mol.

8. The curable coating composition of claim 1, wherein the SMAA is prepared by Atom Transfer Radical Polymerization (ATRP).

9. The curable coating composition of claim 1, wherein the mono- or the di-functional carbinol terminated PDMS has a molecular weight ranging from 400 to 50,000 g/mol.

10. The curable coating composition of claim 1, wherein the SMAA comprises the reaction product of:
    (a1) at least one halogen-functional PDMS macroinitiator;
    (a2) at least one zwitterionic monomer;
    (a3) at least one transition metal catalyst;
    (a4) at least one reducing agent;
    (a5) at least one ligand; and
    (a6) at least one solvent,
wherein the halogen-terminated PDMS macroinitiator is prepared by converting the mono- or the di-functional carbinol terminated PDMS into the halogen-functional PDMS macroinitiator.

11. The curable coating composition of claim 1, wherein the SMAA is prepared by:
    converting the mono- or the di-functional carbinol terminated PDMS into a halogen-functional PDMS macroinitiator; and
    polymerizing the halogen-functional PDMS macroinitiator with a zwitterionic monomer using atom-transfer radical polymerization (ATRP).

12. The curable coating composition of claim 11, wherein the SMAA is prepared in the presence of a transition metal catalyst, a ligand, a reducing agent, and a solvent.

13. The curable coating composition of claim 12, wherein the ratio of zwitterionic monomer:halogen-functional PDMS macroinitiator:transition metal catalyst:reducing agent:ligand:solvent is 100:0.2:0.01:0.05:0.15.

14. The curable coating composition of claim 1, wherein the at least one polyisocyanate is selected from the group consisting of an aliphatic polyisocyanate, a cycloaliphatic polyisocyanate, an araliphatic polyisocyanate, an aromatic polyisocyanate, and mixtures thereof.

15. The curable coating composition of claim 14, wherein the polyisocyanate is isophorone diisocyanate and trimers thereof.

16. The curable coating composition of claim 1, wherein the polyol is selected from the group consisting of a polyester polyol, a polyether polyol, a polycarbonate polyol, an acrylic polyol, and mixtures thereof.

17. The curable coating composition of claim 16, wherein the polyol is selected from an acrylic polyol.

18. The curable coating composition of claim 1, wherein the A-PDMS is at least one aminopropyl-terminated PDMS.

19. The curable coating composition of claim 1, wherein the SMAA is a block copolymer of the mono- or the di-functional carbinol terminated PDMS and poly(sulfobetaine methacrylate), the polyisocyanate is a polyisocyanate derived from isophorone diisocyanate, the polyol is an acrylic polyol composed of 80% butyl acrylate and 20% 2-hydroxyethyl acrylate, and the A-PDMS is an aminopropyl-terminated PDMS.

20. A cured coating composition of claim 1.

21. An object coated with the curable coating composition of claim 1.

22. A method for reducing or preventing biofouling of a surface exposed to an aqueous environment comprising the steps of:
    coating the surface with a curable coating composition of claim 1 to form a coated surface, and
    curing the coating composition on the coated surface.

23. A marine fouling-release coating comprising the curable coating composition of claim 1.

24. A method of making the curable coating composition of claim 1, comprising:
    combining the at least one SMAA, the at least one polyisocyanate, the at least one polyol, and the at least one A-PDMS.

25. The curable coating composition of claim 1, wherein the mono-functional carbinol terminated PDMS has the following structure:

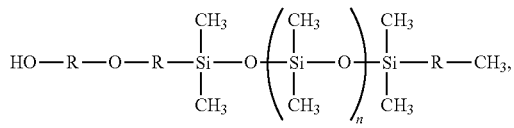

or

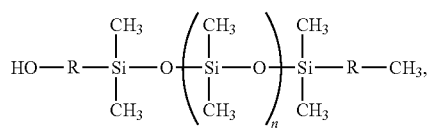

and
the di-functional carbinol terminated PDMS has the following structure:

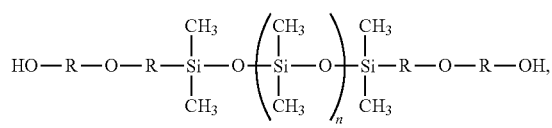

or

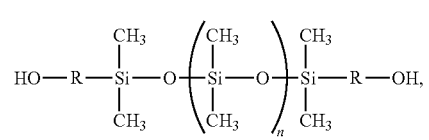

wherein R, independent of one another, is a $C_3$-$C_{12}$ straight chain alkyl or an alkylene ether; and
wherein n ranges from 0 to about 270.

* * * * *